US009708087B2

(12) United States Patent
Qiu

(10) Patent No.: US 9,708,087 B2
(45) Date of Patent: Jul. 18, 2017

(54) SILICONE HYDROGEL LENS WITH A CROSSLINKED HYDROPHILIC COATING

(71) Applicant: Novartis AG, Basel (CH)

(72) Inventor: Yongxing Qiu, Duluth, GA (US)

(73) Assignee: Novartis AG, Basel (CH)

(*) Notice: Subject to any disclaimer, the term of this patent is extended or adjusted under 35 U.S.C. 154(b) by 399 days.

(21) Appl. No.: 14/571,851

(22) Filed: Dec. 16, 2014

(65) Prior Publication Data

US 2015/0166205 A1  Jun. 18, 2015

Related U.S. Application Data

(60) Provisional application No. 61/916,879, filed on Dec. 17, 2013.

(51) Int. Cl.
C08F 8/00 (2006.01)
G02B 1/04 (2006.01)
B65B 31/00 (2006.01)
B65B 7/16 (2006.01)
G02B 1/14 (2015.01)

(52) U.S. Cl.
CPC .............. B65B 31/00 (2013.01); B65B 7/16 (2013.01); G02B 1/043 (2013.01); G02B 1/14 (2015.01); G02B 2207/109 (2013.01)

(58) Field of Classification Search
USPC ...................................... 523/107; 351/159.33
See application file for complete search history.

(56) References Cited

U.S. PATENT DOCUMENTS

| | | |
|---|---|---|
| 2,296,891 A | 9/1942 | Andersen |
| 2,926,154 A | 2/1960 | Keim |
| 3,224,986 A | 12/1965 | Butler |
| 3,408,429 A | 10/1968 | Wichterle |
| 3,434,984 A | 3/1969 | Hyland, Jr. |
| 3,488,327 A | 1/1970 | Kollinsky |
| 3,566,874 A | 3/1971 | Shepherd |
| 3,583,950 A | 6/1971 | Kollinsky |
| 3,598,790 A | 8/1971 | Kollinsky |
| 3,609,126 A | 9/1971 | Asao |
| 3,616,935 A | 11/1971 | Love |
| 3,617,344 A | 11/1971 | Leininger |
| 3,634,123 A | 1/1972 | Eriksson |
| 3,639,141 A | 2/1972 | Dyck |
| 3,663,288 A | 5/1972 | Miller |
| 3,695,921 A | 10/1972 | Shepherd |
| 3,700,623 A | 10/1972 | Keim |
| 3,717,502 A | 2/1973 | Masuhara |
| 3,772,076 A | 11/1973 | Keim |
| 3,813,695 A | 6/1974 | Podell, Jr. |
| 3,844,989 A | 10/1974 | Harumiya |
| 3,861,396 A | 1/1975 | Vaillancourt |
| 3,895,166 A | 7/1975 | Wood |
| 3,900,672 A | 8/1975 | Hammond |
| 3,925,178 A | 12/1975 | Gesser |
| 3,975,350 A | 8/1976 | Hudgin |
| 4,060,657 A | 11/1977 | Iwami |
| 4,118,485 A | 10/1978 | Eriksson |
| 4,132,695 A | 1/1979 | Burkholder |
| 4,136,250 A | 1/1979 | Mueller |
| 4,143,949 A | 3/1979 | Chen |
| 4,153,641 A | 5/1979 | Deichert |
| 4,154,898 A | 5/1979 | Burkholder, Jr. |
| 4,168,112 A | 9/1979 | Ellis |
| 4,182,822 A | 1/1980 | Chang |
| 4,189,546 A | 2/1980 | Deichert |
| 4,191,596 A | 3/1980 | Dollman |
| 4,217,038 A | 8/1980 | Letter |
| 4,229,838 A | 10/1980 | Mano |
| 4,254,248 A | 3/1981 | Friends |
| 4,259,467 A | 3/1981 | Keogh |
| 4,260,725 A | 4/1981 | Keogh |
| 4,261,875 A | 4/1981 | LeBoeuf |
| 4,263,188 A | 4/1981 | Hampton |
| 4,276,402 A | 6/1981 | Chromecek |
| 4,280,970 A | 7/1981 | Kesting |
| 4,293,642 A | 10/1981 | Beavan |
| 4,298,639 A | 11/1981 | Van Eenam |
| 4,298,715 A | 11/1981 | Van Eenam |
| 4,312,575 A | 1/1982 | Peyman |
| 4,327,203 A | 4/1982 | Deichert |
| 4,341,887 A | 7/1982 | Buriks |
| 4,341,889 A | 7/1982 | Deichert |
| 4,343,927 A | 8/1982 | Chang |
| 4,347,198 A | 8/1982 | Ohkada |
| 4,355,147 A | 10/1982 | Deichert |
| 4,373,009 A | 2/1983 | Winn |
| 4,379,893 A | 4/1983 | O'Malley |
| 4,407,791 A | 10/1983 | Stark |
| 4,427,823 A | 1/1984 | Inagaki |
| 4,444,711 A | 4/1984 | Schad |
| 4,450,045 A | 5/1984 | Hertel |
| 4,460,534 A | 7/1984 | Boehm |
| 4,462,665 A | 7/1984 | Shah |
| 4,486,577 A | 12/1984 | Mueller |
| 4,487,808 A | 12/1984 | Lambert |
| 4,495,313 A | 1/1985 | Larsen |
| 4,499,154 A | 2/1985 | James |
| 4,521,564 A | 6/1985 | Solomon |
| 4,525,346 A | 6/1985 | Stark |
| 4,527,293 A | 7/1985 | Eckstein |

(Continued)

FOREIGN PATENT DOCUMENTS

| | | |
|---|---|---|
| CA | 2378841 C | 1/2007 |
| EP | 0321403 A2 | 6/1989 |

(Continued)

OTHER PUBLICATIONS

Sean P. Cullen, Ian C. Mandel, and Padma Gopalan, Surace-Anchored Poly(2-vinyl-4,4-dimethyl azlactone) Brushes as Templates for Enzyme Immobilization, Langmuir, 2008 24 (23) pp. 13701-13709.

(Continued)

Primary Examiner — Tae H Yoon
(74) Attorney, Agent, or Firm — Sheng-Hsin Hu

(57) ABSTRACT

The present invention generally relates to a cost-effective and time-efficient method for applying a crosslinked hydrophilic coating onto a silicone hydrogel contact lens to reduce its positively charged preservatives such as PHMB uptake and to improve its hydrophilicity and lubricity.

16 Claims, No Drawings

(56) References Cited

U.S. PATENT DOCUMENTS

| | | | |
|---|---|---|---|
| 4,543,398 | A | 9/1985 | Bany |
| 4,546,123 | A | 10/1985 | Schäfer |
| 4,548,844 | A | 10/1985 | Podell |
| 4,565,740 | A | 1/1986 | Gölander |
| 4,575,476 | A | 3/1986 | Podell |
| 4,605,712 | A | 8/1986 | Mueller |
| 4,613,665 | A | 9/1986 | Larm |
| 4,631,072 | A | 12/1986 | Koller |
| 4,661,575 | A | 4/1987 | Tom |
| 4,684,538 | A | 8/1987 | Klemarczyk |
| 4,695,608 | A | 9/1987 | Engler |
| 4,703,097 | A | 10/1987 | Wingler |
| 4,720,512 | A | 1/1988 | Hu |
| 4,734,475 | A | 3/1988 | Goldenberg |
| 4,758,595 | A | 7/1988 | Ogunbiyi |
| 4,786,556 | A | 11/1988 | Hu |
| 4,791,175 | A | 12/1988 | Janssen |
| 4,833,218 | A | 5/1989 | Lee |
| 4,837,289 | A | 6/1989 | Mueller |
| 4,876,126 | A | 10/1989 | Takemura |
| 4,892,402 | A | 1/1990 | Sawamoto |
| 4,895,896 | A | 1/1990 | Müller-Lierheim |
| 4,920,184 | A | 4/1990 | Schäfer |
| 4,943,460 | A | 7/1990 | Markle |
| 4,954,586 | A | 9/1990 | Toyoshima |
| 4,954,587 | A | 9/1990 | Mueller |
| 4,959,074 | A | 9/1990 | Halpern |
| 4,968,532 | A | 11/1990 | Janssen |
| 4,973,359 | A | 11/1990 | Yamasoe |
| 4,973,493 | A | 11/1990 | Guire |
| 4,978,481 | A | 12/1990 | Janssen |
| 4,979,959 | A | 12/1990 | Guire |
| 4,990,357 | A | 2/1991 | Karakelle |
| 5,002,582 | A | 3/1991 | Guire |
| 5,010,141 | A | 4/1991 | Mueller |
| 5,019,393 | A | 5/1991 | Ito |
| 5,034,461 | A | 7/1991 | Lai |
| 5,037,647 | A | 8/1991 | Chowman |
| 5,039,459 | A | 8/1991 | Kindt-Larsen |
| 5,039,761 | A | 8/1991 | Ono |
| 5,049,403 | A | 9/1991 | Larm |
| 5,053,048 | A | 10/1991 | Pinchuk |
| 5,061,738 | A | 10/1991 | Solomon |
| 5,070,170 | A | 12/1991 | Robertson |
| 5,079,093 | A | 1/1992 | Akashi |
| 5,079,319 | A | 1/1992 | Mueller |
| 5,080,924 | A | 1/1992 | Kamel |
| 5,091,205 | A | 2/1992 | Fan |
| 5,108,776 | A | 4/1992 | Goldberg |
| 5,112,900 | A | 5/1992 | Buddenhagen |
| 5,132,108 | A | 7/1992 | Narayanan |
| 5,135,297 | A | 8/1992 | Valint, Jr. |
| 5,135,516 | A | 8/1992 | Sahatjian |
| 5,155,194 | A | 10/1992 | Kossmehl |
| 5,160,790 | A | 11/1992 | Elton |
| 5,165,919 | A | 11/1992 | Sasaki |
| 5,208,111 | A | 5/1993 | Decher |
| 5,210,111 | A | 5/1993 | Goldenberg |
| 5,214,452 | A | 5/1993 | Kossmehl |
| 5,217,492 | A | 6/1993 | Guire |
| 5,229,211 | A | 7/1993 | Murayama |
| 5,262,484 | A | 11/1993 | Coleman |
| 5,263,992 | A | 11/1993 | Guire |
| 5,270,046 | A | 12/1993 | Sakamoto |
| 5,272,012 | A | 12/1993 | Opolski |
| 5,290,548 | A | 3/1994 | Goldberg |
| 5,290,585 | A | 3/1994 | Elton |
| 5,292,514 | A | 3/1994 | Capecchi |
| 5,308,641 | A | 5/1994 | Cahalan |
| 5,312,873 | A | 5/1994 | Gregor |
| 5,346,946 | A | 9/1994 | Yokoyama |
| 5,348,873 | A | 9/1994 | Matsuda |
| 5,350,800 | A | 9/1994 | Verhoeven |
| 5,352,714 | A | 10/1994 | Lai |
| 5,355,213 | A | 10/1994 | Dotan |
| 5,358,995 | A | 10/1994 | Lai |
| 5,387,632 | A | 2/1995 | Lai |
| 5,397,848 | A | 3/1995 | Yang |
| 5,407,715 | A | 4/1995 | Buddenhagen |
| 5,408,002 | A | 4/1995 | Coleman |
| 5,408,280 | A | 4/1995 | von der Haegen |
| 5,409,731 | A | 4/1995 | Nakagawa |
| 5,416,131 | A | 5/1995 | Wolff |
| 5,416,132 | A | 5/1995 | Yokoyama |
| 5,417,969 | A | 5/1995 | Hsu |
| 5,441,488 | A | 8/1995 | Shimura |
| 5,442,402 | A | 8/1995 | Sohn |
| 5,443,907 | A | 8/1995 | Slaikeu |
| 5,451,617 | A | 9/1995 | Lai |
| 5,461,433 | A | 10/1995 | Nakabayashi |
| 5,470,944 | A | 11/1995 | Bonsignore |
| 5,475,450 | A | 12/1995 | Meadows |
| 5,476,665 | A | 12/1995 | Dennison |
| 5,486,579 | A | 1/1996 | Lai |
| 5,495,064 | A | 2/1996 | James |
| 5,500,732 | A | 3/1996 | Ebel |
| 5,508,317 | A | 4/1996 | Müller |
| 5,509,899 | A | 4/1996 | Fan |
| 5,510,004 | A | 4/1996 | Allen |
| 5,510,418 | A | 4/1996 | Rhee |
| 5,527,925 | A | 6/1996 | Chabrecek |
| 5,528,357 | A | 6/1996 | Davis |
| 5,532,311 | A | 7/1996 | Sirvio |
| 5,562,922 | A | 10/1996 | Lambert |
| 5,563,056 | A | 10/1996 | Swan |
| 5,574,554 | A | 11/1996 | Su |
| 5,578,675 | A | 11/1996 | Mormile |
| 5,583,163 | A | 12/1996 | Müller |
| 5,583,463 | A | 12/1996 | Merritt |
| 5,584,882 | A | 12/1996 | Yabushita |
| 5,591,140 | A | 1/1997 | Narayanan |
| 5,597,873 | A | 1/1997 | Chambers |
| 5,599,576 | A | 2/1997 | Opolski |
| 5,612,389 | A | 3/1997 | Chabrecek |
| 5,612,391 | A | 3/1997 | Chabrecek |
| 5,614,035 | A | 3/1997 | Nadkarni |
| 5,620,738 | A | 4/1997 | Fan |
| 5,621,018 | A | 4/1997 | Chabrecek |
| 5,626,000 | A | 5/1997 | Edwards |
| 5,633,504 | A | 5/1997 | Collins |
| 5,648,422 | A | 7/1997 | Collins |
| 5,670,558 | A | 9/1997 | Onishi |
| 5,672,638 | A | 9/1997 | Verhoeven |
| 5,674,942 | A | 10/1997 | Hill |
| 5,681,510 | A | 10/1997 | Valint, Jr. |
| 5,688,855 | A | 11/1997 | Stoy |
| 5,693,034 | A | 12/1997 | Buscemi |
| 5,700,559 | A | 12/1997 | Sheu |
| 5,702,754 | A | 12/1997 | Zhong |
| 5,705,583 | A | 1/1998 | Bowers |
| 5,710,302 | A | 1/1998 | Kunzler |
| 5,712,326 | A | 1/1998 | Jones |
| 5,712,327 | A | 1/1998 | Chang |
| 5,712,356 | A | 1/1998 | Bothe |
| 5,717,781 | A | 2/1998 | Ebel |
| 5,719,669 | A | 2/1998 | Ross, III |
| 5,723,145 | A | 3/1998 | Shikinami |
| 5,731,087 | A | 3/1998 | Fan |
| 5,739,236 | A | 4/1998 | Bowers |
| 5,748,300 | A | 5/1998 | Wilder |
| 5,760,100 | A | 6/1998 | Nicolson |
| 5,766,158 | A | 6/1998 | Opolski |
| 5,776,999 | A | 7/1998 | Nicolson |
| 5,779,943 | A | 7/1998 | Enns |
| 5,783,650 | A | 7/1998 | Bowers |
| 5,789,461 | A | 8/1998 | Nicolson |
| 5,789,462 | A | 8/1998 | Motani |
| 5,789,464 | A | 8/1998 | Müller |
| 5,792,531 | A | 8/1998 | Littleton |
| 5,800,412 | A | 9/1998 | Zhang |
| 5,801,822 | A | 9/1998 | Lafferty |
| 5,804,318 | A | 9/1998 | Pinchuk |
| 5,805,264 | A | 9/1998 | Janssen |
| 5,805,276 | A | 9/1998 | Davis |

(56) References Cited

U.S. PATENT DOCUMENTS

| | | |
|---|---|---|
| 5,807,944 A | 9/1998 | Hirt |
| 5,811,151 A | 9/1998 | Hendriks |
| 5,818,573 A | 10/1998 | Lafferty |
| 5,828,446 A | 10/1998 | Davis |
| 5,843,346 A | 12/1998 | Morrill |
| 5,849,810 A | 12/1998 | Müller |
| 5,849,811 A | 12/1998 | Nicolson |
| 5,855,825 A | 1/1999 | Ito |
| 5,858,653 A | 1/1999 | Duran |
| 5,859,107 A | 1/1999 | Jones |
| 5,866,113 A | 2/1999 | Hebdriks |
| 5,869,127 A | 2/1999 | Zhong |
| 5,871,823 A | 2/1999 | Anders |
| 5,874,500 A | 2/1999 | Rhee |
| 5,879,436 A | 3/1999 | Kramer |
| 5,879,697 A | 3/1999 | Ding |
| 5,882,687 A | 3/1999 | Park |
| 5,885,647 A | 3/1999 | Larm |
| 5,894,002 A | 4/1999 | Boneberger |
| 5,910,518 A | 6/1999 | Nakada |
| 5,922,161 A | 7/1999 | Wu |
| 5,922,249 A | 7/1999 | Ajello |
| 5,936,052 A | 8/1999 | Bothe |
| 5,936,703 A | 8/1999 | Miyazaki |
| 5,945,498 A | 8/1999 | Höpken |
| 5,962,548 A | 10/1999 | Vanderlaan |
| 5,965,631 A | 10/1999 | Nicolson |
| 5,981,615 A | 11/1999 | Meijs |
| 5,981,675 A | 11/1999 | Valint, Jr. |
| 5,995,213 A | 11/1999 | Davis |
| 5,997,517 A | 12/1999 | Whitbourne |
| 6,007,526 A | 12/1999 | Passalaqua |
| 6,018,001 A | 1/2000 | Hiratani |
| 6,039,913 A | 3/2000 | Hirt |
| 6,043,328 A | 3/2000 | Domschke |
| 6,048,620 A | 4/2000 | Zhong |
| 6,054,504 A | 4/2000 | Dalla Riva Toma |
| 6,063,484 A | 5/2000 | Exsted |
| 6,087,415 A | 7/2000 | Vanderlaan |
| 6,087,462 A | 7/2000 | Bowers |
| 6,090,901 A | 7/2000 | Bowers |
| 6,096,138 A | 8/2000 | Heiler |
| 6,096,726 A | 8/2000 | Opolski |
| 6,099,122 A | 8/2000 | Chabrecek |
| 6,099,852 A | 8/2000 | Jen |
| 6,106,889 A | 8/2000 | Beavers |
| 6,134,342 A | 10/2000 | Duke |
| 6,149,842 A | 11/2000 | Lally |
| 6,165,322 A | 12/2000 | Bower |
| 6,169,127 B1 | 1/2001 | Lohmann |
| 6,179,817 B1 | 1/2001 | Zhong |
| 6,193,369 B1 | 2/2001 | Valint, Jr. |
| 6,207,796 B1 | 3/2001 | Dairoku |
| 6,218,508 B1 | 4/2001 | Kragh |
| 6,221,061 B1 | 4/2001 | Engelson |
| 6,225,431 B1 | 5/2001 | Bowers |
| 6,238,799 B1 | 5/2001 | Opolski |
| 6,284,854 B1 | 9/2001 | Bowers |
| 6,301,005 B1 | 10/2001 | Epstein |
| 6,303,687 B1 | 10/2001 | Müller |
| 6,306,514 B1 | 10/2001 | Weikel |
| 6,314,199 B1 | 11/2001 | Höfer |
| 6,323,165 B1 | 11/2001 | Heiler |
| 6,340,465 B1 | 1/2002 | Hsu |
| 6,342,570 B1 | 1/2002 | Bothe |
| 6,346,170 B1 | 2/2002 | Bower |
| 6,348,507 B1 | 2/2002 | Heiler |
| 6,364,934 B1 | 4/2002 | Nandu |
| 6,367,929 B1 | 4/2002 | Maiden |
| 6,410,616 B1 | 6/2002 | Harada |
| 6,428,839 B1 | 8/2002 | Künzler |
| 6,429,267 B1 | 8/2002 | Riehle |
| 6,436,481 B1 | 8/2002 | Chabrecek |
| 6,440,366 B1 | 8/2002 | Salpekar |
| 6,440,571 B1 | 8/2002 | Valint, Jr. |
| 6,447,920 B1 | 9/2002 | Chabrecek |
| 6,451,871 B1 | 9/2002 | Winterton |
| 6,465,056 B1 | 10/2002 | Chabrecek |
| 6,465,602 B2 | 10/2002 | Schroeder |
| 6,478,423 B1 | 11/2002 | Turner |
| 6,479,227 B1 | 11/2002 | Kubo |
| 6,482,221 B1 | 11/2002 | Hebert |
| 6,500,481 B1 | 12/2002 | Vanderlaan |
| 6,517,678 B1 | 2/2003 | Shannon |
| 6,521,352 B1 | 2/2003 | Chabrecek |
| 6,531,432 B2 | 3/2003 | Molock |
| 6,534,559 B1 | 3/2003 | Vanderlaan |
| 6,537,614 B1 | 3/2003 | Wei |
| 6,551,267 B1 | 4/2003 | Cohen |
| 6,582,754 B1 | 6/2003 | Pasic |
| 6,586,038 B1 | 7/2003 | Chabrecek |
| 6,586,520 B1 | 7/2003 | Canorro |
| 6,589,665 B2 | 7/2003 | Chabrecek |
| 6,596,294 B2 | 7/2003 | Lai |
| 6,599,559 B1 | 7/2003 | McGee |
| 6,602,930 B2 | 8/2003 | Imafuku |
| 6,614,516 B2 | 9/2003 | Epstein |
| 6,623,747 B1 | 9/2003 | Chatelier |
| 6,623,786 B2 | 9/2003 | Baron |
| 6,627,124 B1 | 9/2003 | Herbrechtsmeier |
| 6,630,243 B2 | 10/2003 | Valint, Jr. |
| 6,638,563 B2 | 10/2003 | McGee |
| 6,673,447 B2 | 1/2004 | Wei |
| 6,683,062 B2 | 1/2004 | Opolski |
| 6,686,054 B2 | 2/2004 | Nigam |
| 6,689,480 B2 | 2/2004 | Shimoyama |
| 6,699,435 B2 | 3/2004 | Salpekar |
| 6,719,929 B2 | 4/2004 | Winterton |
| 6,730,366 B2 | 5/2004 | Lohmann |
| 6,733,123 B2 | 5/2004 | Polzhofer |
| 6,734,321 B2 | 5/2004 | Chabrecek |
| 6,740,336 B2 | 5/2004 | Trubetskoy |
| 6,743,878 B2 | 6/2004 | Bowers |
| 6,762,264 B2 | 7/2004 | Künzler |
| 6,793,973 B2 | 9/2004 | Winterton |
| 6,794,456 B2 | 9/2004 | Grobe, III |
| 6,800,225 B1 | 10/2004 | Hagmann |
| 6,811,805 B2 | 11/2004 | Gilliard |
| 6,822,016 B2 | 11/2004 | McCabe |
| 6,835,410 B2 | 12/2004 | Chabrecek |
| 6,838,491 B1 | 1/2005 | Vanderlaan |
| 6,858,310 B2 | 2/2005 | McGee |
| 6,866,936 B2 | 3/2005 | Opolski |
| 6,866,938 B2 | 3/2005 | Mori |
| 6,867,245 B2 | 3/2005 | Iwata |
| 6,878,399 B2 | 4/2005 | Chabrecek |
| 6,884,457 B2 | 4/2005 | Gilliard |
| 6,891,010 B2 | 5/2005 | Kunzler |
| 6,896,926 B2 | 5/2005 | Qiu |
| 6,902,812 B2 | 6/2005 | Valint, Jr. |
| 6,921,802 B2 | 7/2005 | Künzler |
| 6,923,538 B2 | 8/2005 | Dean |
| 6,923,978 B2 | 8/2005 | Chatelier |
| 6,926,965 B2 | 8/2005 | Qiu |
| 6,936,641 B2 | 8/2005 | Molock |
| 6,940,580 B2 | 9/2005 | Winterton |
| 6,951,894 B1 | 10/2005 | Nicolson |
| 7,018,688 B2 | 3/2006 | Shepherd |
| 7,032,251 B2 | 4/2006 | Janssen |
| 7,052,131 B2 | 5/2006 | McCabe |
| 7,091,283 B2 | 8/2006 | Müller |
| 7,160,953 B2 | 1/2007 | Bowers |
| 7,238,750 B2 | 7/2007 | Müller |
| 7,247,692 B2 | 7/2007 | Laredo |
| 7,249,848 B2 | 7/2007 | Laredo |
| 7,268,189 B2 | 9/2007 | Müller |
| 7,268,198 B2 | 9/2007 | Kunzler |
| 7,270,678 B2 | 9/2007 | Valint, Jr. |
| 7,297,725 B2 | 11/2007 | Winterton |
| 7,344,607 B2 | 3/2008 | Melzer |
| 7,360,890 B2 | 4/2008 | Back |
| 7,364,723 B1 | 4/2008 | Nakada |
| 7,384,590 B2 | 6/2008 | Kelly |
| 7,387,759 B2 | 6/2008 | Kelly |

(56) References Cited

U.S. PATENT DOCUMENTS

| | | |
|---|---|---|
| 7,396,890 B2 | 7/2008 | Zanini |
| 7,399,795 B2 | 7/2008 | Lai |
| 7,423,074 B2 | 9/2008 | Lai |
| 7,426,993 B2 | 9/2008 | Coldrey |
| 7,428,029 B2 | 9/2008 | Murakami |
| 7,429,558 B2 | 9/2008 | Batchelor |
| 7,429,623 B2 | 9/2008 | Molock |
| 7,435,452 B2 | 10/2008 | Shimoyama |
| 7,452,377 B2 | 11/2008 | Watling |
| 7,468,398 B2 | 12/2008 | Nicolson |
| 7,521,519 B1 | 4/2009 | Hirt |
| 7,538,146 B2 | 5/2009 | Nicolson |
| 7,540,609 B2 | 6/2009 | Chen |
| 7,553,880 B2 | 6/2009 | Nicolson |
| 7,556,858 B2 | 7/2009 | Rasmussen |
| 7,572,841 B2 | 8/2009 | Chen |
| 7,588,334 B2 | 9/2009 | Matsushita |
| 7,632,876 B2 | 12/2009 | Lai |
| 7,671,156 B2 | 3/2010 | Phelan |
| 7,691,917 B2 | 4/2010 | Lai |
| 7,726,809 B2 | 6/2010 | Filippo |
| 7,780,879 B2 | 8/2010 | Pruitt |
| 7,781,536 B2 | 8/2010 | Kamiya |
| 7,781,554 B2 | 8/2010 | Lai |
| 7,789,509 B2 | 9/2010 | Mentak |
| 7,832,856 B2 | 11/2010 | Vanderbilt |
| 7,841,716 B2 | 11/2010 | McCabe |
| 7,847,025 B2 | 12/2010 | Liu |
| 7,857,447 B2 | 12/2010 | Myung |
| 7,875,687 B2 | 1/2011 | Kunzler |
| 7,879,267 B2 | 2/2011 | Turner |
| 7,919,136 B2 | 4/2011 | Linhardt |
| 8,092,724 B2 | 1/2012 | Pruitt |
| 8,163,206 B2 | 4/2012 | Chang |
| 8,440,735 B2 | 5/2013 | Pruitt |
| 8,480,227 B2 | 7/2013 | Qiu |
| 8,529,057 B2 | 9/2013 | Qiu |
| 8,557,334 B2 | 10/2013 | Samuel |
| 8,689,971 B2 | 4/2014 | Minick |
| 2001/0019762 A1 | 9/2001 | Nazarova |
| 2002/0120084 A1 | 8/2002 | Valint, Jr. |
| 2002/0149742 A1 | 10/2002 | Back |
| 2002/0182315 A1 | 12/2002 | Heiler |
| 2003/0039748 A1 | 2/2003 | Valint, Jr. |
| 2003/0175325 A1 | 9/2003 | Chatelier |
| 2003/0186825 A1 | 10/2003 | Mitani |
| 2004/0116564 A1 | 6/2004 | Devlin |
| 2004/0170752 A1 | 9/2004 | Luthra |
| 2005/0060812 A1 | 3/2005 | Batchelor |
| 2005/0228065 A1 | 10/2005 | Nicolson |
| 2006/0063852 A1 | 3/2006 | Iwata |
| 2006/0100113 A1 | 5/2006 | Pegram |
| 2006/0142410 A1 | 6/2006 | Baba |
| 2006/0217276 A1 | 9/2006 | Mitani |
| 2007/0037898 A1 | 2/2007 | Phelan |
| 2007/0066706 A1 | 3/2007 | Manesis |
| 2007/0105973 A1 | 5/2007 | Nicolson |
| 2007/0105974 A1 | 5/2007 | Nicolson |
| 2007/0122540 A1 | 5/2007 | Salamone |
| 2007/0149428 A1 | 6/2007 | Ammon, Jr. |
| 2007/0185281 A1 | 8/2007 | Song |
| 2007/0229758 A1 | 10/2007 | Matsuzawa |
| 2007/0296914 A1 | 12/2007 | Hong |
| 2008/0003259 A1 | 1/2008 | Salamone |
| 2008/0015315 A1 | 1/2008 | Chang |
| 2008/0017525 A1 | 1/2008 | Newman |
| 2008/0100796 A1 | 5/2008 | Pruitt |
| 2008/0110770 A1 | 5/2008 | Burke |
| 2008/0138310 A1 | 6/2008 | Ketelson |
| 2008/0142038 A1 | 6/2008 | Kunzler |
| 2008/0143003 A1 | 6/2008 | Phelan |
| 2008/0143957 A1 | 6/2008 | Linhardt |
| 2008/0143958 A1 | 6/2008 | Medina |
| 2008/0148689 A1 | 6/2008 | Xia |
| 2008/0152540 A1 | 6/2008 | Schorzman |
| 2008/0152800 A1 | 6/2008 | Bothe |
| 2008/0170201 A1 | 7/2008 | Filippo |
| 2008/0174035 A1 | 7/2008 | Winterton |
| 2008/0226922 A1 | 9/2008 | Ferreiro |
| 2008/0231798 A1 | 9/2008 | Zhou |
| 2008/0234457 A1 | 9/2008 | Zhou |
| 2008/0273168 A1 | 11/2008 | Rathore |
| 2008/0275156 A1 | 11/2008 | Laredo |
| 2008/0306455 A1 | 12/2008 | Dias |
| 2008/0307751 A1 | 12/2008 | Newman |
| 2008/0314767 A1 | 12/2008 | Lai |
| 2009/0036577 A1 | 2/2009 | Luo |
| 2009/0039535 A1 | 2/2009 | Nicolson |
| 2009/0046242 A1 | 2/2009 | Nicolson |
| 2009/0057164 A1 | 3/2009 | Minick |
| 2009/0100801 A1 | 4/2009 | Zhao |
| 2009/0111942 A1 | 4/2009 | Lang |
| 2009/0141234 A1 | 6/2009 | Blackwell |
| 2009/0142485 A1 | 6/2009 | Lai |
| 2009/0142508 A1 | 6/2009 | Lai |
| 2009/0145086 A1 | 6/2009 | Reynolds |
| 2009/0145091 A1 | 6/2009 | Connolly |
| 2009/0160074 A1 | 6/2009 | Pruitt |
| 2009/0168012 A1 | 7/2009 | Linhardt |
| 2009/0169716 A1 | 7/2009 | Linhardt |
| 2009/0171027 A1 | 7/2009 | Linhardt |
| 2009/0171049 A1 | 7/2009 | Linhardt |
| 2009/0171050 A1 | 7/2009 | Linhardt |
| 2009/0171459 A1 | 7/2009 | Linhardt |
| 2009/0173044 A1 | 7/2009 | Linhardt |
| 2009/0173045 A1 | 7/2009 | Lai |
| 2009/0173643 A1 | 7/2009 | Lai |
| 2009/0182067 A1 | 7/2009 | Liu |
| 2009/0186229 A1 | 7/2009 | Müller |
| 2009/0238948 A1 | 9/2009 | Muller |
| 2009/0264553 A1 | 10/2009 | Chen |
| 2009/0280157 A1 | 11/2009 | Maas |
| 2010/0029802 A1 | 2/2010 | Mehrabi |
| 2010/0048847 A1 | 2/2010 | Broad |
| 2010/0084775 A1 | 4/2010 | McCabe |
| 2010/0118261 A1 | 5/2010 | McGee |
| 2010/0127219 A1 | 5/2010 | Mohamed |
| 2010/0149482 A1 | 6/2010 | Ammon, Jr. |
| 2010/0152084 A1 | 6/2010 | Rathore |
| 2010/0162661 A1 | 7/2010 | Vanderbilt |
| 2010/0162663 A1 | 7/2010 | McGee |
| 2010/0225881 A1 | 9/2010 | Filippo |
| 2010/0238398 A1 | 9/2010 | Nicolson |
| 2010/0240776 A1 | 9/2010 | Filippo |
| 2010/0249356 A1 | 9/2010 | Rathore |
| 2010/0258961 A1 | 10/2010 | Chang |
| 2010/0276823 A1 | 11/2010 | Pruitt |
| 2010/0276824 A1 | 11/2010 | Pruitt |
| 2010/0296049 A1 | 11/2010 | Justynska |
| 2010/0298446 A1 | 11/2010 | Chang |
| 2010/0300902 A1 | 12/2010 | Marmo |
| 2011/0009519 A1 | 1/2011 | Awasthi |
| 2011/0009587 A1 | 1/2011 | Awasthi |
| 2011/0015298 A1 | 1/2011 | Schorzman |
| 2011/0102736 A1 | 5/2011 | Wu |
| 2011/0134387 A1 | 6/2011 | Samuel |
| 2012/0026457 A1 | 2/2012 | Qiu |
| 2012/0029111 A1 | 2/2012 | Chang |
| 2012/0172478 A1 | 7/2012 | Chang |
| 2014/0237945 A1 | 8/2014 | Minick |

FOREIGN PATENT DOCUMENTS

| | | |
|---|---|---|
| EP | 0362137 A2 | 4/1990 |
| EP | 0362145 A2 | 4/1990 |
| EP | 0393532 A2 | 10/1990 |
| EP | 0455323 A2 | 11/1991 |
| EP | 0480809 A2 | 4/1992 |
| EP | 0537972 A1 | 4/1993 |
| EP | 0574352 A1 | 12/1993 |
| EP | 0713106 A1 | 5/1996 |
| EP | 0728487 A1 | 8/1996 |
| EP | 0747071 A1 | 12/1996 |
| EP | 0751407 A2 | 1/1997 |

(56) References Cited

FOREIGN PATENT DOCUMENTS

| | | |
|---|---|---|
| EP | 0758687 A1 | 2/1997 |
| EP | 0780419 A1 | 6/1997 |
| EP | 0832618 A1 | 4/1998 |
| EP | 0940447 A2 | 9/1999 |
| EP | 0940693 A2 | 9/1999 |
| EP | 0963761 A1 | 12/1999 |
| EP | 1272353 B1 | 12/2003 |
| EP | 1287060 B1 | 11/2005 |
| EP | 1214383 B1 | 12/2005 |
| EP | 1149198 B1 | 4/2006 |
| EP | 1179190 B1 | 4/2006 |
| EP | 1153964 B1 | 7/2006 |
| EP | 1569702 B1 | 10/2006 |
| EP | 1754731 A1 | 2/2007 |
| EP | 1802357 B1 | 12/2009 |
| EP | 1945688 B1 | 12/2010 |
| JP | 61209275 A2 | 9/1986 |
| JP | 08239639 A | 9/1996 |
| WO | 8909246 A1 | 10/1989 |
| WO | 9104283 A1 | 4/1991 |
| WO | 9209639 A2 | 6/1992 |
| WO | 9209650 A1 | 6/1992 |
| WO | 9300391 A1 | 1/1993 |
| WO | 9406485 A1 | 3/1994 |
| WO | 9504609 A1 | 2/1995 |
| WO | 9618498 A1 | 6/1996 |
| WO | 9620796 A1 | 7/1996 |
| WO | 9624392 A1 | 8/1996 |
| WO | 9637241 A1 | 11/1996 |
| WO | 9700274 A1 | 1/1997 |
| WO | 9718904 A1 | 5/1997 |
| WO | 9721497 A1 | 6/1997 |
| WO | 9723532 A1 | 7/1997 |
| WO | 9729160 A1 | 8/1997 |
| WO | 9821270 A1 | 5/1998 |
| WO | 9828026 A1 | 7/1998 |
| WO | 9915917 A1 | 4/1999 |
| WO | 9935520 A1 | 7/1999 |
| WO | 0037385 A1 | 6/2000 |
| WO | 0072052 A1 | 11/2000 |
| WO | 0157118 A2 | 8/2001 |
| WO | 03037960 A1 | 5/2003 |
| WO | 03059967 A1 | 7/2003 |
| WO | 2004050132 A2 | 6/2004 |
| WO | 2005031400 A2 | 4/2005 |
| WO | 2006038080 A2 | 4/2006 |
| WO | 2006088758 A2 | 8/2006 |
| WO | 2007017243 A1 | 2/2007 |
| WO | 2008073193 A2 | 6/2008 |
| WO | 2008076506 A1 | 6/2008 |
| WO | 2008095955 A1 | 8/2008 |
| WO | 2009032122 A1 | 3/2009 |
| WO | 2009085902 A1 | 7/2009 |
| WO | 2010071691 A1 | 6/2010 |

OTHER PUBLICATIONS

Kazuo Sugiyama and Koji Ohga, Surface modified poly(methyl methacrylate) with 1-methyl-2-methacrylamidoethyl phosphorylcholine moiety, Macromol. Chem. Phys 200, No. 6 (1999) pp. 1439-1445.

Joël Baguet, Françoise Sommer, Véronique Claudon-Eyl and Tran Minh Duc, Characterization of lacrymal component accumulation on worn soft contact lens surfaces by atomic force microscopy, Biomaterials 16 (1995) pp. 3-9.

Joël Baguet, Fraçoise Sommer, Tran Minh Duc, Imaging surfaces of hydrophilic contact lenses with the atomic force microscope, Biomaterials 1993, vol. 14, No. 4, pp. 279-284.

Z. M. Jin and D Dowson, Elastohydrodynamic lubrication in biological systems, Proc. IMechE (2005) vol. 219, Part J: J. Engineering Tribology pp. 367-380.

Jeannine E. Elliott, Mara MacDonald, Jun Nie, Christopher N. Bowman, Structure and swelling of poly(acrylic acid) hydrogels: effect of pH, ionic strength, and dilution on the crosslinked polymer structure, Polymer 45 (2004) pp. 1503-1510.

Niriam V. Flores-Merino, Somot Chirasatitsin, Caterina Lopresti, Gwendolen C. Reilly, Giuseppe Battaglia and Adam J. Engler, Nanoscopic mechanical anisotropy in hydrogel surfaces, The Royal Society of Chemistry 2010.

F. Formasiero, J.M. Prausnitz, C.J. Radke, Post-lens tear-film depletion due to evaporative dehydration of a soft contact lens, Journal of Membrane Science 275 (2006) pp. 229-243.

Francesco Fornasiero, Florian Krull, John M. Prausnitz, Clayton J. Radke, Steady-state diffusion of water through soft-contact-lens materials, Biomaterials 26 (2005) pp. 5704-5716.

Jian Ping Gong, Takayuki Kurokawa, Tetsuharu Narita, Go Kagata, Yoshihito Osada, Goro Nishimura and Masataka Kinjo, Synthesis of Hydrogels with Extremely Low Surface Friction, J. Am. Chem. Soc. 2001, 123 pp. 5582-5583.

J.M. González-Méijome, J.B. Almeida and M.A. Parafita, Analysis of surface Mechanical Properties of Unworn and Worn Silicone Hydrogel Contact Lenses Using Nanoindentation with AFM, Microscopy: Science, Technology, Applications and Education, (Formatex 2010) pp. 554-559.

George L. Grobe III, Paul L. Valint, Jr. and Daniel M. Ammon, Jr., Surface chemical structure for soft contact lenses as a function of polymer processing, Journal of Biomedical Materials Research, vol. 32 pp. 45-54, 1996.

Murat Guvendiren, Jason A. Burdick, and Shu Yang, Kinetic study of swelling-induced surface pattern formation and ordering in hydrogel films with depth-wise crosslinking gradient, Soft matter, 2010, vol. 6, pp. 2044-2049.

Gavin Hoch, Anuj Chauhan, C. J. Radke, Permability and diffusivity for water transport through hydrogel membranes, Journal of Membrane Science 214 (2003) pp. 199-209.

R.E. Imhof, H.J.S. Birch, F.R. Thornley and J.R. Gilchrist, Opto-thermal Transient Emission Radiometry: a New Surface Analysis Technique, Analytical Proceedings, Jan. 1987, vol. 24, pp. 17-18.

L. Jones, C. May, L. Nazar, T. Simpson, In vitro evaluation of the dehydration characteristics of silicone hydrogel and conventional hydrogel contact lens materials, Contact Lens & Anterior Eye 25 (2002) pp. 147-156.

Lyndon Jones, Lakshman Subbaraman, Ronan Rogers, and Kathy Dumbleton, Surface treatment, wetting and modulus of silicone hydrogels, Contact Lens Monthly, Optician, Sep. 1, 2006, No. 6067, vol. 232, pp. 28-34.

Seong Han Kim, Aric Opdahl, Chris Marmo, Gabor A. Somorjai, AFM and SFG studies of pHEMA-based hydrogel contact lens surfaces in saline solution: adhesion, friction, and the presence of non-crosslinked polymer chains at the surface, Biomaterials 23 (2002) pp. 1657-1666.

Seong Han Kim, Chris Marmo, Gabor A. Somorjia, Friction studies of hydrogel contact lenses using AFM: non-crosslinked polymers of low friction at the surface, Biomaterials 22 (2001) pp. 3285-3294.

Gerald E. Lowther, Hydrophilic Lens Inspection with Phase Contrast Microscopy, American Journal of Optometry & Physiological Optics, vol. 58, No. 8, pp. 621-625, Aug. 1981.

M.D. Merindano, M. Canals, C. Saona and J. Costa, Rigid gas permeable contact lenses surface roughness examined by interferential shifting phase and scanning electron microscopies, Ophthal. Physiol. Opt. vol. 18, No. 1, pp. 75-92, 1998.

K.J. Stout, L. Blunt, Nanometres to micrometres: three-dimensional surface measurement in bio-engineering, Surface and Coatings Technology 71 (1995) pp. 69-81.

Oğuz Okay, Safiye B. Sariisik, Swelling behavior of poly(acrylamide-co-sodium acrylate) hydrogels in aqueous salt solutions: theory versus experiments, European Polymer Journal 36 (2000) pp. 393-399.

Sudi Patel, Waheeda Illahi, Arthur Davis, Changes in water content of high plus hydrogel lenses worn on an extended wear basis in a geriatric aphakic population, Contact Lens & Anterior Eye 28 (2005) pp. 127-134.

Carol E. Rabke, Paul L. Valint, Jr., and Daniel M. Ammon, Opthamalic Applications of Atomic Force Microscopy, ICLC, vol. 22, Jan./Feb. 1995, pp. 32-41.

(56) References Cited

OTHER PUBLICATIONS

V. Rebeix, F. Sommer, B. Marchin, D. Baude, Tran Minh Duc Article Artificial tear adsorption on soft contact lenses: methods to test surfactant efficacy, Biomaterials, 21 (2000), pp. 1197-1205.

Ronan Rogers, In vitro and ex vivo wettability of hydrogel contact lenses, Thesis, University of Waterloo, Waterloo, Ontario, Canada, (2006).

F.M. Serry, Applications of Atomic Force Microscopy for Contact Lens Manufacturing, Veeco Instruments, Inc., (2004) www.veeco.com.

Christopher Snyder, OD, MS, FAAO, A Primer on Contact Lens Materials, http://www.clspectrum.com/references.asp; (2004) Contact Lense Spectrum, Document 102.

Kim Sweers, Kees Van Der Werf, Martin Bennink and Vinod Subramaniam, Nanomechanical properties of a-synuclein amyloid fibrils: a comparative study by nanoindentation, harmonic force microscopy, and Peakforce QNM, Nanoscale Research Letters, 2011, 6:270, pp. 1-10.

Gareth Ross, Muriel Nasso, Val Franklin, Fiona Lydon and Brian Tighe, Silicone Hydrogels: Trends in Products and Properties, Biomaterials Research Unit, Aston University, Birmingham B4 &ET (2005).

David A. Tirrell, Doreen Y. Takigawa and Kenji Seki, pH Sensitization of Phospholipid Vesicles via Complexation with Synthetic Poly(carboxylic acid)s, Annals of the New York Academy of Sciences, (1985) vol. 446, pp. 237-248.

Ioannis Tranoudis, Nathan Efron, Water properties of soft contact lens materials, Contact Lens & Anterior Eye 27 (2004) pp. 193-208.

Sean L. Willis, Jane L. Court, Richard P. Redman, Hin-Hai Wang, Simon W. Leppard, Wincent J. O'Byrne, Sharon A. Small, Andrew L. Lewis, Stephen A. Jones, Peter W. Stratford, A novel phosphorylcholine-coated contact lens for extended wear use, Biomaterials 22 (2001) pp. 3261-3272.

Peng Xiao, Robert E. Imhof, Opto-Thermal Skin Water Concentration Gradient, Measurement, School of EE &IE, South Bank University, (1996) vol. 2681, pp. 31-41.

English Translation of Japan Office Action, Patent Application No. 2013-521994, Dispatch No. 183411, Dispatch Date: Apr. 21, 2015.

English Translation of Chinese Office Action, Chinese Patent Application for Invention No: 201180037428.8, Office Action Issue date: Dec. 19, 2013.

Canadian Examiner's Report dated Apr. 3, 2014, Canadian Application No. 2,802,337.

English Translation of Taiwan Search Report, Application No. 100127120, dated Feb. 10, 2015.

Sang-Kyu Kam, John Gregory, Charge determination of synthetic cationic polyelectrolytes by colloid titration, Colloids and Surfaces A Physiochemical and Engineering Aspects 159 (1999) 165-179.

Niklaus Bühler, Hans-Peter Haerri, Manfred Hofmann, Christine Irrgang, Andreas Mühlebach, Beat Müller, and Friedrich Stockinge, Nelfilcon A, a New Material for Contact Lenses, Chimia 53 (1999) 269-274 Industrial Chemistry.

N. Dilsiz and G. Akovali, Plasma Polymerization of Selected Organic Compounds, Polymer, (1996) vol. 37, No. 2, pp. 333-342.

Frank Jansen, Ph.D., Plasma Deposited Thin Films (Chapter 1),Plasma Deposition Processes (19), CRC Press (1986), Boca Raton, FL, Editors: F. Jansen and J. Mort, Ph.D.

H. Yasuda,Glow Discharge Polymerization, Journal of Polymer Science: Macromolecular Reviews, vol. 16 (1981), pp. 199-293.

D. M. Mattox, The Application of Plasmas to Thin Film Deposition Processes, Plasma-Surface Interactions and Processing of Materials, Kluwer Academic Publishers in NATO ASI Series; Series E: Applied Sciences, vol. 176 (1990), pp. 377-399 Editors: O. Auciello, Alberto Gras-Marti, Jose Antonio Valles-Abarca, Daniel L. Flamm.

Nathan Efron, Graeme Young, Dehydration of Hydrogel Contact Lenses in Vitro and in Vivo, Opthal. Physiol. Opt., 1988, vol. 8(3), pp. 253-256.

Philip B. Morgan, Ph.D. and Nathan Efron, D.SC, In Vivo Dehydration of Silicone Hydrogel Contact Lenses, Eye & Contact Lens, 2003, vol. 29(3), pp. 173-176.

Noel A. Brennan, Russell Lowe, Nathan Efron and Michael G. Harris, In Vivo Dehydration of Disposable (Acuvue) Contact Lenses, Optometry and Vision Science, 1990, vol. 67(3), pp. 201-203.

SILICONE HYDROGEL LENS WITH A CROSSLINKED HYDROPHILIC COATING

This application claims the benefit under 35 USC §119 (e) of U.S. provisional application No. 61/916,879 filed 17 Dec. 2013, incorporated by reference in its entirety.

The present invention generally relates to a cost-effective and time-efficient method for applying a crosslinked hydrophilic coating onto a silicone hydrogel contact lens to reduce its positively charged preservatives such as PHMB uptake and to improve its hydrophilicity and lubricity.

BACKGROUND

In recent years, soft silicone hydrogel contact lenses, for example, Focus NIGHT & DAY™ and AIROPTIX™ (CIBA VISION), and PureVision™ (Bausch & Lomb) become more and more popular because of their high oxygen permeability and comfort. "Soft" contact lenses conform closely to the shape of the eye, so oxygen cannot easily circumvent the lens. Soft contact lenses must allow oxygen from the surrounding air (i.e., oxygen) to reach the cornea because the cornea does not receive oxygen from the blood supply like other tissue. If sufficient oxygen does not reach the cornea, corneal swelling occurs. Extended periods of oxygen deprivation cause the undesirable growth of blood vessels in the cornea. By having high oxygen permeability, a silicone hydrogel contact lens allows sufficient oxygen permeate through the lens to the cornea and to have minimal adverse effects on corneal health.

However, a silicone hydrogel material typically has a surface or at least some areas of its surface which is hydrophobic (non-wettable). Lipids or proteins from the ocular environment can be adsorbed onto hydrophobic surface or surface areas of a silicone hydrogel contact lens. The hydrophobic surface or surface areas of a silicone hydrogel contact lens may cause it be adhered to the eye. Thus, a silicone hydrogel contact lens will generally require a surface modification to increase surface hydrophilicity.

A known method for modifying the hydrophilicity of a relatively hydrophobic contact lens material is to attach hydrophilic polymers onto contact lenses according to various mechanisms (see for example, U.S. Pat. Nos. 6,099,122, 6,436,481, 6,440,571, 6,447,920, 6,465,056, 6,521,352, 6,586,038, 6,623,747, 6,730,366, 6,734,321, 6,835,410, 6,878,399, 6,923,978, 6,440,571, and 6,500,481, US Patent Application Publication Nos. 2009/0145086 A1, 2009/0145091A1, 2008/0142038A1, and 2007/0122540A1, all of which are herein incorporated by reference in their entireties). Although those techniques can be used in rendering a silicone hydrogel material wettable, they may not be cost-effective and/or time-efficient for implementation in a mass production environment, because they typically require relatively long time and/or involve laborious, multiple steps to obtain a hydrophilic coating.

The amino groups and or carboxyl groups introduced on and or the surface of silicone hydrogel contact lens render the lenses hydrophilic, i.e. they wet easily and absorb water and also contribute to lens hydrophilic character. With water absorption, the lenses also may take up chemicals dissolved in the water. When contact lens care products containing compounds bearing positive charges are used with the contact lenses, an ionic interaction can take place between the contact lenses and those components. Use of products containing such components can produce undesirable clinical symptoms in some persons, such as diffuse corneal staining and product intolerance.

The most common preservatives and disinfecting agents known are Polyhexamethylenebiguanide (PHMB), polymeric quaternary ammonium compound such as Polyquaternium-1® and other positively charged preservatives. It was found that many of these preservatives and disinfecting agents become concentrated in the lenses to a sufficient degree that when the lens is placed in the aqueous environment of the eye, the preservatives or disinfectants are released from the lens and cause eye irritation. This problem was found to be particularly severe with positively charged preservatives or disinfecting components.

Therefore, there is a need for a cost-effective and time-efficient method for reducing hydrophilic silicone hydrogel contact lens' positively charged preservatives such as PHMB uptake. There is still a need for a cost-effective and time-efficient method of applying a crosslinked hydrophilic coating onto a silicone hydrogel contact lens to reduce its positively charged preservatives such as PHMB uptake and to improve its hydrophilicity and lubricity. In addition, the present invention provides an ophthalmic lens product

SUMMARY OF THE INVENTION

The invention, in one aspect, provides a method for producing silicone hydrogel contact lenses with crosslinked hydrophilic coatings thereon, comprising the steps of:

(a) obtaining a silicone hydrogel contact lens having amino groups and/or carboxyl groups on and/or near its surface and a water-soluble and thermally-crosslinkable hydrophilic polymeric material, wherein the silicone hydrogel contact lens comprises amino groups or carboxyl groups or both on and/or near the surface of the contact lens, wherein the hydrophilic polymeric material comprises (i) from about 20% to about 95%, preferably from about 35% to about 90%, more preferably from about 50% to about 85%, by weight of first polymer chains derived from an epichlorohydrin-functionalized polyamine or polyamidoamine, (ii) from about 5% to about 80%, preferably from about 10% to about 65%, even more preferably from about 15% to about 50%, by weight of hydrophilic moieties or second polymer chains derived from at least one hydrophilicity-enhancing agent having at least one reactive functional group selected from the group consisting of amino group, carboxyl group, thiol group, and combination thereof, and (iii) positively-charged azetidinium groups which are parts of the first polymer chains or pendant or terminal groups covalently attached to the first polymer chains, wherein the hydrophilic moieties or second polymer chains are covalently attached to the first polymer chains through one or more covalent linkages each formed between one azetitdinium group of the epichlorohydrin-functionalized polyamine or polyamidoamine and one amino, carboxyl or thiol group of the hydrophilicity-enhancing agent; and (b) heating the silicone hydrogel contact lens immersed in an in-packing-coating packaging solution comprising the hydrophilic polymeric material and at least one buffering agent in an amount sufficient to maintain a pH of from about 6.0 to about 8.5 and has a tonicity of from about 200 to about 450 milliosmol (mOsm) and a viscosity of from about 1 centipoise to about 20 centipoises at 25° C. in a lens package to and at a temperature from about 40° C. to about 140° C., preferably from about 60° C. to about 120° C., even more preferably from about 75° C. to about 95° C., most preferably from about 80° C. to about 90° C., for a period of time sufficient to covalently attach the hydrophilic polymeric material onto the surface of the silicone hydrogel contact lens through second covalent linkages each formed between one azetidinium group of the hydrophilic polymeric material and one of the reactive functional groups on and/or near the surface of the contact lens, thereby forming a crosslinked hydrophilic coating on the silicone hydrogel contact lens, (c) adding a polyazetidinium groups-containing component into the in-packing-coating solution with the silicone contact lens of the step (b), wherein the polyazetidinium groups-containing component comprise at least two groups selected from the group consisting of Formula (II), Formula (III) and mixtures thereof:

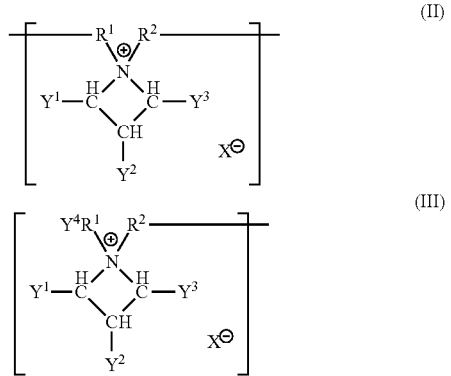

wherein: $R^1$ and $R^2$ are independently an alkylene group containing 1 to 6 carbon atoms; X is an anionic counterion; $Y^1$, $Y^2$ and $Y^3$ are each independently selected from the group consisting of hydrogen, hydroxyl, halo, alkoxy, alkyl, amino, carboxy, acetoxy, cyano and sulfhydryl; and $Y^4$ is a chain-terminating group, selected from the group consisting of hydrogen, alkyl, alkoxy and acyloxy;

(d) sealing the lens package with the contact lens and the in-packing-coating solution of step (c)

(e) reducing the concentration of amino groups and/or carboxyl groups on and/or near the silicone hydrogel contact lens by autoclaving the package with the contact lens and the in-package-coating solution therein of step (d) and inducing reaction between azetidinium groups of the polyazetidinium groups-containing component and residual amino groups and/or carboxyl groups remained on and/or the surface of the silicone hydrogel contact lens immersed in the in-package-coating solution, wherein the reduction of the concentration of amino groups and/or carboxyl groups on and/or near the silicone hydrogel contact lens of step (e) is characterized by having an decreased positively charged preservatives uptake in relation to the silicone hydrogel contact lens of step (b) by at least 20%.

These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be affected without departing from the spirit and scope of the novel concepts of the disclosure.

DETAILED DESCRIPTION OF EMBODIMENTS OF THE INVENTION

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

A "silicone hydrogel contact lens" refers to a contact lens comprising a silicone hydrogel material. A "silicone hydrogel" refers to a silicone-containing polymeric material which can absorb at least 10 percent by weight of water when it is fully hydrated and is obtained by copolymerization of a polymerizable composition comprising at least one silicone-containing vinylic monomer or at least one silicone-containing vinylic macromer or at least one silicone-containing prepolymer having ethylenically unsaturated groups.

A "vinylic monomer", as used herein, refers to a low molecular weight compound that has an ethylenically unsaturated group and can be polymerized actinically or thermally. Low molecular weight typically means average molecular weights less than 700 Daltons.

The term "olefinically unsaturated group" or "ethylenically unsaturated group" is employed herein in a broad sense and is intended to encompass any groups containing at least one >C=C< group. Exemplary ethylenically unsaturated groups include without limitation (meth)acryloyl methacryloyl

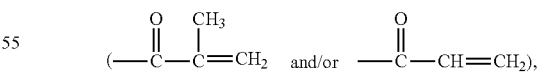

allyl, vinyl

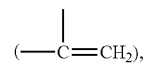

styrenyl, or other C=C containing groups.

The term "(meth)acrylamide" refers to methacrylamide and/or acrylamide.

The term "(meth)acrylate" refers to methacrylate and/or acrylate.

A "hydrophilic vinylic monomer", as used herein, refers to a vinylic monomer which as a homopolymer typically yields a polymer that is water-soluble or can absorb at least 10 percent by weight water.

A "hydrophobic vinylic monomer", as used herein, refers to a vinylic monomer which as a homopolymer typically yields a polymer that is insoluble in water and can absorb less than 10 percent by weight water.

A "macromer" or "prepolymer" refers to a medium and high molecular weight compound or polymer that contains ethylenically unsaturated groups. Medium and high molecular weight typically means average molecular weights greater than 700 Daltons.

A "polymer" means a material formed by polymerizing/crosslinking one or more monomers or macromers or prepolymers.

"Molecular weight" of a polymeric material (including monomeric or macromeric materials), as used herein, refers to the weight-average molecular weight unless otherwise specifically noted or unless testing conditions indicate otherwise.

The term "amino group" refers to a primary or secondary amino group of formula —NHR', where R' is hydrogen or a $C_1$-$C_{20}$ unsubstituted or substituted, linear or branched alkyl group, unless otherwise specifically noted.

An "epichlorohydrin-functionalized polyamine" or "epichlorohydrin-functionalized polyamidoamine" refers to a polymer obtained by reacting a polyamine or polyamidoamine with epichlorohydrin to convert all or a substantial percentage of amine groups of the polyamine or polyamidoamine into azetidinium groups.

An "azetidinium group" refers to a positively charged group of

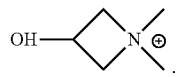

The term "thermally-crosslinkable" in reference to a polymeric material or a functional group means that the polymeric material or the functional group can undergo a crosslinking (or coupling) reaction with another material or functional group at a relatively-elevated temperature (from about 40° C. to about 140° C.), whereas the polymeric material or functional group cannot undergo the same crosslinking reaction (or coupling reaction) with another material or functional group at room temperature (i.e., from about 22° C. to about 28° C., preferably from about 24° C. to about 26° C., in particular at about 25° C.) to an extend detectable for a period of about one hour.

The term "reactive vinylic monomer" refers to a vinylic monomer having a carboxyl group or an amino group (i.e., a primary or secondary amino group).

The term "non-reactive hydrophilic vinylic monomer" refers to a hydrophilic vinylic monomer which is free of any carboxyl group or amino group (i.e., primary or secondary amino group). A non-reactive vinylic monomer can include a tertiary or quaternium amino group.

The term "a polyazetidinium groups-containing component" refers to a polymer comprises at least two groups selected from the group consisting of Formula (II), Formula (III) and mixtures thereof:

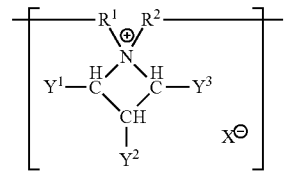

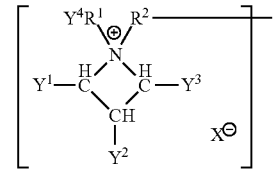

wherein: $R^1$ and $R^2$ are independently an alkylene group containing 1 to 6 carbon atoms; X is an anionic counterion; $Y^1$, $Y^2$ and $Y^3$ are each independently selected from the group consisting of hydrogen, hydroxyl, halo, alkoxy, alkyl, amino, carboxy, acetoxy, cyano and sulfhydryl; and $Y^4$ is a chain-terminating group, selected from the group consisting of hydrogen, alkyl, alkoxy and acyloxy.

The term "water-soluble" in reference to a polymer means that the polymer can be dissolved in water to an extent sufficient to form an aqueous solution of the polymer having a concentration of up to about 30% by weight at room temperature (defined above).

A "water contact angle" refers to an average water contact angle (i.e., contact angles measured by Sessile Drop method), which is obtained by averaging measurements of contact angles with at least 3 individual contact lenses.

The invention is generally directed to a cost-effective and time-efficient method for applying a crosslinked hydrophilic coating onto a silicone hydrogel contact lens to reduce its positively charged preservatives such as PHMB uptake and to improve its hydrophilicity.

The invention is partly based on the discoveries that a water-soluble, azetidinium-containing, and thermally-crosslinkable hydrophilic polymeric material, which is a polyamine-epichlorohydrin or polyamidoamine-epichlorohydrin derivative, can be used to form a crosslinked coating with a good surface hydrophilicity and/or wettability, a good hydrophilicity and a good intactness on a silicone hydrogel contact lens. At a relatively elevated temperature (defined above), positively-charged azetidinium groups react with functional groups such as amino groups, thiol groups, and carboxylate ion —COO⁻ (i.e., the deprotonated form of a carboxyl group) to form neutral, hydroxyl-containing covalent linkages as illustrated in the scheme I Scheme I

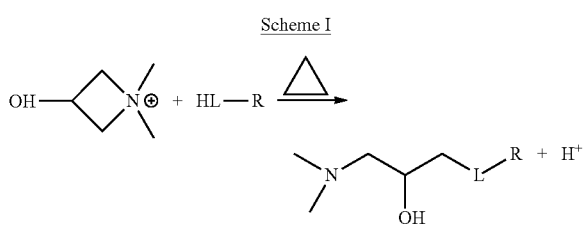

in which R is the rest portion of a compound, L is —NR'— in which R' is hydrogen, a $C_1$-$C_{20}$ unsubstituted or substituted, linear or branched alkyl group or a polymer chain —S—, or —OC(=O)—. Because of the thermally-controllable reactivity of azetidinium groups, polyamine-epichlorohydrin or polyamidoamine-epichlorohydrin (PAE) has been widely used as a wet-strengthening agent. However, PAE has not been successfully used to form crosslinked coatings on contact lenses, probably because crosslinked PAE coatings may not be able to impart desirable hydrophilicity/wettability to contact lenses. It is discovered here that PAE can be chemically-modified with a hydrophilicity-enhancing agent (especially a hydrophilic polymer) having one or more functional groups each capable of reacting with one azetidinium group, to obtain a water-soluble, azetidinium-containing polymeric material. Such polymeric material, which is still thermally-crosslinkable (reactive) due to the presence of azetidinium groups, can be used to form a crosslinked coating on a silicone hydrogel contact lens having reactive functional groups (e.g., amino groups, carboxyl groups, thiol groups, or combinations thereof) on and/or near its surface. And, the resultant coating on the contact lens has an improved surface hydrophilicity and/or wettability relative to a control coating obtained by using an unmodified (original or starting) PAE.

It is believed that a hydrophilicity-enhancing agent may play at least two roles in increasing resultant crosslinked coatings: adding hydrophilic polymer chains onto a polyamine or polyamidoamine polymer chain to form a highly-branched hydrophilic polymeric material with dangling polymer chains and/or chain segments; and decreasing the crosslinking density of the crosslinked coating by reducing significantly the number of azetidinium groups of the crosslinkable polymeric material (coating material). A coating with a loose structure and dangling polymer chains and/or chain segments is believed to impart a good surface hydrophilicity and wettability.

The invention is also partly based on the discoveries that a crosslinked coating of the invention can be advantageously formed onto a silicone hydrogel contact lens directly in a lens package containing the contact lens immersed in a lens packaging solution in the presence of a water-soluble azetidinium-containing polymeric material. The presence of the azetidinium-containing polymeric material can be accomplished either by adding the azetidinium-containing polymeric material in the lens packaging solution, or by, prior to packaging, depositing physically a layer of the azetidinium-containing polymeric material onto the surface of a contact lens at room temperature.

Typically, contact lenses, which are hydrated and packaged in a packaging solution, must be sterilized. Sterilization of the hydrated lenses during manufacturing and packaging is typically accomplished by autoclaving. The autoclaving process involves heating the packaging of a contact lens to a temperature of from about 118° C. to about 125° C. for approximately 20-40 minutes under pressure.

The invention is further partly based on the discoveries that an in-package-coating process with two heating steps can be used to reduce the concentration of amino groups and/or carboxyl groups on and/or near the silicone hydrogel contact lens while the silicone hydrogel contact lens still maintains its surface hydrophilicity (or wettability) measured by Sessile Drop. The reduction of the concentration carboxyl groups on and/or near the silicone hydrogel contact lens is characterized by having a decreased positively charged preservatives uptake relative to the silicone hydrogel contact lens without addition of polyamidoamine epichlorohydrin into the package solution during autoclaving. During the first heating step, the silicone hydrogel contact lens in an aqueous solution is heated in the presence of the hydrophilic polymeric material to and at a temperature from about 40° C. to about 140° C. for a period of time sufficient to covalently attach the hydrophilic polymeric material onto the surface of the silicone hydrogel contact lens through covalent linkages each formed between one azetidinium group of the hydrophilic polymeric material and one of the reactive functional groups on and/or near the surface of the contact lens to form a crosslinked hydrophilic coating on the silicone hydrogel contact lens. The silicone hydrogel contact lens with the crosslinked hydrophilic coating has a surface wettability characterized by having an averaged water contact angle of about 90 degrees or less. However, the resulting silicone hydrogel contact lens with the crosslinked hydrophilic coating may have a high residual charge, for example, carboxyl groups which is introduced on and/or the surface of silicone hydrogel contact lens during the crosslinked hydrophilic coating process. This process is disclosed in commonly assigned U.S. Pat. No. 8,529,057, herein incorporated by reference in its entirety. During the second heating step, reaction between azetidinium groups of the polyazetidinium groups-containing component introduced for this second heating step and residual amino groups and/or carboxyl groups remained on and/or the surface of the silicone hydrogel contact lens immersed in the in-package-coating solution, after the second heating step, reduce the concentration of amino groups and/or carboxyl groups on and/or near the silicone hydrogel contact lens. The reduction of negative charge is characterized by having a decreased positively charged preservatives uptake in relation to the silicone hydrogel contact lens of without second heating process by at least 20%.

The first and second heating step may have the same temperature such as autoclaving process temperature. However, it is preferably the first heating temperature is lower than 100 degree centigrade to avoid the expensive high pressure heating process.

The invention, in one aspect, provides a method for producing silicone hydrogel contact lenses with crosslinked hydrophilic coatings thereon, comprising the steps of:

(a) obtaining a silicone hydrogel contact lens having amino groups and/or carboxyl groups on and/or near its surface and a water-soluble and thermally-crosslinkable hydrophilic polymeric material, wherein the silicone hydrogel contact lens comprises amino groups or carboxyl groups or both on and/or near the surface of the contact lens, wherein the hydrophilic polymeric material comprises (i) from about 20% to about 95%, preferably from about 35% to about 90%, more preferably from about 50% to about 85%, by weight of first polymer chains derived from an epichlorohydrin-functionalized polyamine or polyamidoamine, (ii) from about 5% to about 80%, preferably from about 10% to about 65%, even more preferably from about 15% to about 50%, by weight of hydrophilic moieties or second polymer chains derived from at least one hydrophilicity-enhancing agent having at least one reactive functional group selected from the group consisting of amino group, carboxyl group, thiol group, and combination thereof, and (iii) positively-charged azetidinium groups which are parts of the first polymer chains or pendant or terminal groups covalently attached to the first polymer chains, wherein the hydrophilic moieties or second polymer chains are covalently attached to the first polymer chains through one or more covalent linkages each formed between one azetitdinium group of the epichlorohydrin-functionalized polyamine or polyamidoamine and one amino, carboxyl or thiol group of the hydrophilicity-enhancing agent; and (b) heating the silicone hydrogel contact lens immersed in a packaging solution comprising the hydrophilic polymeric material and at least one buffering agent in an amount sufficient to maintain a pH of from about 6.0 to about 8.5 and has a tonicity of from about 200 to about 450 milliosmol (mOsm) and a viscosity of from about 1 centipoise to about 20 centipoises at 25° C. in a lens package to and at a temperature from about 40° C. to about 140° C., preferably from about 60° C. to about 120° C., even more preferably from about 75° C. to about 95° C., most preferably from about 80° C. to about 90° C., for a period of time sufficient to covalently attach the hydrophilic polymeric material onto the surface of the silicone hydrogel contact lens through second covalent linkages each formed between one azetidinium group of the hydrophilic polymeric material and one of the reactive functional groups on and/or near the surface of the contact lens, thereby forming a crosslinked hydrophilic coating on the silicone hydrogel contact lens, (c) adding a polyazetidinium groups-containing component into the package solution with the silicone contact lens of the step (b), wherein the polyazetidinium groups-containing component comprise at least two groups selected from the group consisting of Formula (II), Formula (III) and mixtures thereof:

wherein: $R^1$ and $R^2$ are independently an alkylene group containing 1 to 6 carbon atoms; X is an anionic counterion; $Y^1$, $Y^2$ and $Y^3$ are each independently selected from the group consisting of hydrogen, hydroxyl, halo, alkoxy, alkyl, amino, carboxy, acetoxy, cyano and sulfhydryl; and $Y^4$ is a chain-terminating group, selected from the group consisting of hydrogen, alkyl, alkoxy and acyloxy;

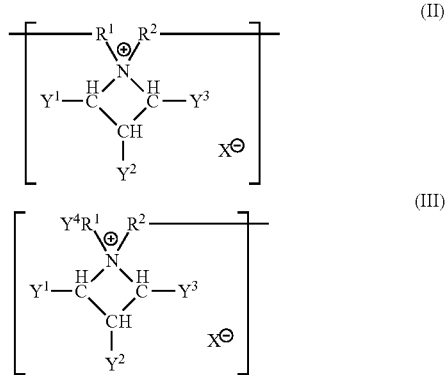

(d) sealing the lens package with the contact lens and the package solution of step (c)

(e) reducing the concentration of amino groups and/or carboxyl groups on and/or near the silicone hydrogel contact lens by autoclaving the package with the contact lens and the in-package-coating solution therein of step (d) and inducing reaction between azetidinium groups of the polyazetidinium groups-containing component and residual amino groups and/or carboxyl groups remained on and/or the surface of the silicone hydrogel contact lens immersed in the in-package-coating solution, wherein the reduction of the concentration of amino groups and/or carboxyl groups on and/or near the silicone hydrogel contact lens of step (e) is characterized by having an decreased positively charged preservatives uptake in relation to the silicone hydrogel contact lens of step (b) by at least 20%.

A person skilled in the art knows very well how to make contact lenses. For example, contact lenses can be produced in a conventional "spin-casting mold," as described for example in U.S. Pat. No. 3,408,429, or by the full cast-molding process in a static form, as described in U.S. Pat. Nos. 4,347,198; 5,508,317; 5,583,463; 5,789,464; and 5,849,810. In cast-molding, a lens formulation typically is dispensed into molds and cured (i.e., polymerized and/or crosslinked) in molds for making contact lenses. For production of silicone hydrogel contact lenses, a lens formulation for cast-molding generally comprises at least one components selected from the group consisting of a silicone-containing vinylic monomer, a silicone-containing vinylic macromer, a silicone-containing prepolymer, a hydrophilic vinylic monomer, a hydrophilic vinylic macromer, a hydrophobic vinylic monomer, and combination thereof, as well known to a person skilled in the art. A silicone hydrogel contact lens formulation can also comprise other necessary components known to a person skilled in the art, such as, for example, a crosslinking agent, a UV-absorbing agent, a visibility tinting agent (e.g., dyes, pigments, or mixtures thereof), antimicrobial agents (e.g., preferably silver nanoparticles), a bioactive agent, leachable lubricants, leachable tear-stabilizing agents, and mixtures thereof, as known to a person skilled in the art. Molded silicone hydrogel contact lenses then can be subjected to extraction with an extraction solvent to remove unpolymerized components from the molded lenses and to hydration process, as known by a person skilled in the art. Numerous silicone hydrogel lens formulations have been described in numerous patents and patent applications published by the filing date of this application.

In accordance with the invention, a silicone hydrogel contact lens can either inherently comprise or be modified to comprise amino groups and/or carboxyl groups on and/or near its surface.

Where a silicone hydrogel contact lens inherently comprises amino groups and/or carboxyl groups on and/or near its surface, it is obtained by polymerizing a silicone hydrogel lens formulation comprising a reactive vinylic monomer.

Preferably, the silicone hydrogel contact lens is made from a lens formulation without limitation comprising at least one reactive vinylic monomer selected from the group consisting of amino-$C_2$-$C_6$ alkyl (meth)acrylate, $C_1$-$C_6$ alkylamino-$C_2$-$C_6$ alkyl (meth)acrylate, allylamine, vinylamine, amino-$C_1$-$C_6$ alkyl (meth)acrylamide, $C_1$-$C_6$ alkylamino-$C_2$-$C_6$ alkyl (meth)acrylamide, acrylic acid, $C_1$-$C_6$ alkylacrylic acid, N,N-2-acrylamidoglycolic acid, and combinations thereof. The lens formulation comprises preferably from about 0.1% to about 10%, more preferably from about 0.25% to about 7%, even more preferably from about 0.5% to about 5%, most preferably from about 0.75% to about 3%, by weight of the reactive vinylic monomer.

A silicone hydrogel contact lens can also be subjected either to a surface treatment to form a reactive base coating having amino groups and/or carboxyl groups on the surface of the contact lens. Examples of surface treatments include without limitation a surface treatment by energy (e.g., a plasma, a static electrical charge, irradiation, or other energy source), chemical treatments, chemical vapor deposition, the grafting of hydrophilic vinylic monomers or macromers onto the surface of an article, layer-by-layer coating ("LbL coating"). "LbL coating", as used herein, refers to a coating that is not covalently attached to the polymer matrix of a contact lens and is obtained through a layer-by-layer ("LbL") deposition of charged or chargeable (by protonation or deprotonation) and/or non-charged materials on the lens. An LbL coating can be composed of one or more layers.

Preferably, the surface treatment is an LbL coating process. In this preferred embodiment (i.e., the reactive LbL base coating embodiment), a resultant silicone hydrogel contact lens comprises a reactive LbL base coating including at least one layer of a reactive polymer (i.e., a polymer having pendant amino groups and/or carboxyl groups), wherein the reactive LbL base coating is obtained by contacting the contact lens with a solution of a reactive polymer. Contacting of a contact lens with a coating solution of a reactive polymer can occur by dipping it into the coating solution or by spraying it with the coating solution. One contacting process involves solely dipping the contact lens in a bath of a coating solution for a period of time or alternatively dipping the contact lens sequentially in a series of bath of coating solutions for a fixed shorter time period for each bath. Another contacting process involves solely spray a coating solution. However, a number of alternatives involve various combinations of spraying- and dipping-steps may be designed by a person having ordinary skill in the art. The contacting time of a contact lens with a coating solution of a reactive polymer may last up to about 10 minutes, preferably from about 5 to about 360 seconds, more preferably from about 5 to about 250 seconds, even more preferably from about 5 to about 200 seconds.

In accordance with this reactive LbL base coating embodiment, the reactive polymer can be a linear or branched polymer having pendant amino groups and/or carboxyl groups. Any polymers having pendant amino groups and/or carboxyl groups can be used as a reactive polymer for forming base coatings on silicone hydrogel contact lenses. Examples of such reactive polymers include without limitation: a homopolymer of a reactive vinylic monomer; a copolymer of two or more reactive vinylic monomers; a copolymer of a reactive vinylic monomer with one or more non-reactive hydrophilic vinylic monomers (i.e., hydrophilic vinylic monomers free of any carboxyl or (primary or secondary) amino group); polyethyleneimine (PEI); polyvinylalcohol with pendant amino groups; a carboxyl-containing cellulose (e.g., carboxymethylcellulose, carboxyethylcellulose, carboxypropylcellulose); hyaluronate; chondroitin sulfate; poly(glutamic acid); poly(aspartic acid); and combinations thereof.

Preferred reactive vinylic monomers are those described previously, with carboxylic acid-containing vinylic monomers as most preferred reactive vinylic monomers for preparing reactive polymers for forming a reactive LbL base coating.

Preferred examples of non-reactive hydrophilic vinylic monomers free of carboxyl or amino group include without limitation acrylamide (AAm), methacrylamide N,N-dimethylacrylamide (DMA), N,N-dimethylmethacrylamide (DMMA), N-vinylpyrrolidone (NVP), N,N,-dimethylaminoethylmethacrylate (DMAEM), N,N-dimethylaminoethylacrylate (DMAEA), N,N-dimethylaminopropylmethacrylamide (DMAPMAm), and those described in U.S. Pat. No. 5,461,433, herein incorporated by reference in its entirety), and combinations thereof.

Preferably, the reactive polymers for forming a reactive LbL base coating are polyacrylic acid, polymethacrylic acid, poly(N,N-2-acrylamidoglycolic acid), poly[(meth)acrylic acid-co-acrylamide], poly[(meth)acrylic acid-co-vinylpyrrolidone], hydrolyzed poly[(meth)acrylic acid-co-vinylacetate], polyethyleneimine (PEI), polyallylamine hydrochloride (PAH) homo- or copolymer, polyvinylamine homo- or copolymer, or combinations thereof.

The weight average molecular weight $M_w$ of a reactive polymer for forming a reactive LbL base coating is at least about 10,000 Daltons, preferably at least about 50,000 Daltons, more preferably at least about 100,000 Daltons, even more preferably from about 10,000 to 1,000,000 Daltons.

A solution of a reactive polymer for forming a reactive LbL base coating on contact lenses can be prepared by dissolving one or more reactive polymers in water, a mixture of water and an organic solvent miscible with water, an organic solvent, or a mixture of one or more organic solvent. Preferably, the reactive polymer is dissolved in a mixture of water and one or more organic solvents, an organic solvent, or a mixture of one or more organic solvent. It is believed that a solvent system containing at least one organic solvent can swell a silicone hydrogel contact lens so that a portion of the reactive polymer may penetrate into the silicone hydrogel contact lens and increase the durability of the reactive base coating. Any organic solvents can be used in preparation of a solution of the reactive polymer.

In another preferred embodiment, a silicone hydrogel comprises inherently amino groups and/or carboxyl groups on and/or near its surface and is further subjected to a surface treatment to form a reactive LbL base coating having amino groups and/or carboxyl groups therein.

In accordance with the invention, a water-soluble and thermally-crosslinkable hydrophilic polymeric material containing azetidinium groups comprises (i.e., has a composition including) from about 20% to about 95%, preferably from about 35% to about 90%, more preferably from about 50% to about 85%, by weight of first polymer chains derived from an epichlorohydrin-functionalized polyamine or polyamidoamine and from about 5% to about 80%, preferably from about 10% to about 65%, even more preferably from about 15% to about 50%, by weight of hydrophilic moieties or second polymer chains derived from at least one hydrophilicity-enhancing agent having at least one reactive functional group selected from the group consisting of amino group, carboxyl group, thiol group, and combination thereof. The composition of the hydrophilic polymeric material is determined by the composition (based on the total weight of the reactants) of a reactants mixture used for preparing the thermally-crosslinkable hydrophilic polymeric material according to the crosslinking reactions shown in Scheme I above. For example, if a reactant mixture comprises about 75% by weight of an epichlorohydrin-functionalized polyamine or polyamidoamine and about 25% by weight of at least one hydrophilicity-enhancing agent based on the total weight of the reactants, then the resultant hydrophilic polymeric material comprise about 75% by weight of first polymer chains derived from the epichlorohydrin-functionalized polyamine or polyamidoamine and about 25% by weight of hydrophilic moieties or second polymer chains derived from said at least one hydrophilicity-enhancing agent. The azetidinium groups of the thermally-crosslinkable hydrophilic polymeric material are those azetidinium groups (of the epichlorohydrin-functionalized polyamine or polyamidoamine) which do not participate in crosslinking reactions for preparing the thermally-crosslinkable hydrophilic polymeric material.

An epichlorohydrin-functionalized polyamine or polyamidoamine can be obtained by reacting epichlorohydrin with a polyamine polymer or a polymer containing primary or secondary amino groups. For example, a poly (alkylene imines) or a poly(amidoamine) which is a polycondensate derived from a polyamine and a dicarboxylic acid (e.g., adipic acid-diethylenetriamine copolymers) can react with epichlorohydrin to form an epichlorohydrin-functionalized polymer. Similarly, a homopolymer or copolymer of aminoalkyl(meth)acrylate, mono-alkylaminoalkyl (meth)acrylate, aminoalkyl(meth)acrylamide, or mono-alkylaminoalkyl (meth)acrylamide can also react with epichlorohydrin to form an epichlorohydrin-functionalized polyamine. The reaction conditions for epichlorohydrin-functionalization of a polyamine or polyamidoamine polymer are taught in EP1465931 (herein incorporated by reference in its entirety). A preferred epichlorohydrin-functionalized polymer is polyaminoamide-epichlorohydrin (PAE) (or polyamide-polyamine-epichlorohydrin or polyamide-epichlorohydrin), such as, for example, Kymene® or Polycup® resins (epichlorohydrin-functionalized adipic acid-diethylenetriamine copolymers) from Hercules or Polycup® or Servamine® resins from Servo/Delden.

Any suitable hydrophilicity-enhancing agents can be used in the invention so long as they contain at least one amino group, at least one carboxyl group, and/or at least one thiol group.

A preferred class of hydrophilicity-enhancing agents include without limitation: amino-, carboxyl- or thiol-containing monosaccharides (e.g., 3-amino-1,2-propanediol, 1-thiolglycerol, 5-keto-D-gluconic acid, galactosamine, glucosamine, galacturonic acid, gluconic acid, glucosaminic acid, mannosamine, saccharic acid 1,4-lactone, saccharide acid, Ketodeoxynonulosonic acid, N-methyl-D-glucamine, 1-amino-1-deoxy-β-D-galactose, 1-amino-1-deoxysorbitol, 1-methylamino-1-deoxysorbitol, N-aminoethyl gluconamide); amino-, carboxyl- or thiol-containing disaccharides (e.g., chondroitin disaccharide sodium salt, di(β-D-xylopyranosyl)amine, digalacturonic acid, heparin disaccharide, hyaluronic acid disaccharide, Lactobionic acid); and amino-, carboxyl- or thiol-containing oligosaccharides (e.g., carboxymethyl-β-cyclodextrin sodium salt, trigalacturonic acid); and combinations thereof.

Another preferred class of hydrophilicity-enhancing agents is hydrophilic polymers having one or more amino, carboxyl and/or thiol groups. More preferably, the content of the amino (—NHR' with R' as defined above), carboxyl (—COOH) and/or thiol (—SH) groups in a hydrophilic polymer as a hydrophilicity-enhancing agent is less than about 40%, preferably less than about 30%, more preferably less than about 20%, even more preferably less than about 10%, by weight based on the total weight of the hydrophilic polymer.

One preferred class of hydrophilic polymers as hydrophilicity-enhancing agents are amino- or carboxyl-containing polysaccharides, for example, such as, carboxymethylcellulose (having a carboxyl content of about 40% or less, which is estimated based on the composition of repeating units, —[$C_6H_{10-m}O_5(CH_2CO_2H)_m$]— in which m is 1 to 3), carboxyethylcellulose (having a carboxyl content of about 36% or less, which is estimated based on the composition of repeating units, —[$C_6H_{10-m}O_5(C_2H_4CO_2H)_m$]— in which m is 1 to 3) carboxypropylcellulose (having a carboxyl content of about 32% or less, which is estimated based on the composition of repeating units, —[$C_6H_{10-m}O_5(C_3H_6CO_2H)_m$]— in which m is 1 to 3), hyaluronic acid (having a carboxyl content of about 11%, which is estimated based on the composition of repeating units, —($C_{13}H_{20}O_9NCO_2H$)—), chondroitin sulfate (having a carboxyl content of about 9.8%, which is estimated based on the composition of repeating units, —($C_{12}H_1O_{13}NSCO_2H$)—), or combinations thereof.

Another preferred class of hydrophilic polymers as hydrophilicity-enhancing agents include without limitation: poly (ethylene glycol) (PEG) with mono-amino, carboxyl or thiol group (e.g., PEG-NH$_2$, PEG-SH, PEG-COOH); H$_2$N-PEG-NH$_2$; HOOC-PEG-COOH; HS-PEG-SH; H$_2$N-PEG-COOH; HOOC-PEG-SH; H$_2$N-PEG-SH; multi-arm PEG with one or more amino, carboxyl or thiol groups; PEG dendrimers with one or more amino, carboxyl or thiol groups; a diamino- or dicarboxyl-terminated homo- or copolymer of a non-reactive hydrophilic vinylic monomer; a monoamino- or monocarboxyl-terminated homo- or copolymer of a non-reactive hydrophilic vinylic monomer; a copolymer which is a polymerization product of a composition comprising (1) about 60% by weight or less, preferably from about 0.1% to about 30%, more preferably from about 0.5% to about 20%, even more preferably from about 1% to about 15%, by weight of one or more reactive vinylic monomers and (2) at least one non-reactive hydrophilic vinylic monomer; and combinations thereof. Reactive vinylic monomer(s) and non-reactive hydrophilic vinylic monomer(s) are those described previously.

More preferably, a hydrophilic polymer as a hydrophilicity-enhancing agent is PEG-NH$_2$; PEG-SH; PEG-COOH; H$_2$N-PEG-NH$_2$; HOOC-PEG-COOH; HS-PEG-SH; H$_2$N-PEG-COOH; HOOC-PEG-SH; H$_2$N-PEG-SH; multi-arm PEG with one or more amino, carboxyl or thiol groups; PEG dendrimers with one or more amino, carboxyl or thiol groups; a monoamino-, monocarboxyl-, diamino- or dicarboxyl-terminated homo- or copolymer of a non-reactive hydrophilic vinylic monomer selected from the group consisting of acryamide (AAm), N,N-dimethylacrylamide (DMA), N-vinylpyrrolidone (NVP), N-vinyl-N-methyl acetamide, glycerol (meth)acrylate, hydroxyethyl (meth)acrylate, N-hydroxyethyl (meth)acrylamide, $C_1$-$C_4$-alkoxy polyethylene glycol (meth)acrylate having a weight average molecular weight of up to 400 Daltons, vinyl alcohol, N-methyl-3-methylene-2-pyrrolidone, 1-methyl-5-methylene-2-pyrrolidone, 5-methyl-3-methylene-2-pyrrolidone, N,N-dimethylaminoethyl (meth)acrylate, N,N-dimethylaminopropyl (metha)crylamide, (meth)acryloyloxyethyl phosphorylcholine, and combinations thereof; a copolymer which is a polymerization product of a composition comprising (1) from about 0.1% to about 30%, preferably from about 0.5% to about 20%, more preferably from about 1% to about 15%, by weight of (meth)acrylic acid, allylamine and/or amino-$C_2$-$C_4$ alkyl (meth)acrylate, and (2) at least one non-reactive hydrophilic vinylic monomer selected from the group consisting of acryamide, N,N-dimethylacrylamide, N-vinylpyrrolidone, (meth)acryloyloxyethyl phosphorylcholine, N-vinyl-N-methyl acetamide, glycerol (meth)acrylate, hydroxyethyl (meth)acrylate, N-hydroxyethyl (meth)acrylamide, $C_1$-$C_4$-alkoxy polyethylene glycol (meth)acrylate having a weight average molecular weight of up to 400 Daltons, vinyl alcohol, and combination thereof.

Most preferably, the hydrophilicity-enhancing agent as a hydrophilicity-enhancing agent is PEG-NH$_2$; PEG-SH; PEG-COOH; monoamino-, monocarboxyl-, diamino- or dicarboxyl-terminated polyvinylpyrrolidone; monoamino-, monocarboxyl-, diamino- or dicarboxyl-terminated polyacrylamide; monoamino-, monocarboxyl-, diamino- or dicarboxyl-terminated poly(DMA); monoamino- or monocarboxyl-, diamino- or dicarboxyl-terminated poly(DMA-co-NVP); monoamino-, monocarboxyl-, diamino- or dicarboxyl-terminated poly(NVP-co-N,N-dimethylaminoethyl (meth)acrylate)); monoamino-, monocarboxyl-, diamino- or dicarboxyl-terminated poly(vinylalcohol); monoamino-, monocarboxyl-, diamino- or dicarboxyl-terminated poly[(meth)acryloyloxyethyl phosphrylcholine] homopolymer or copolymer; monoamino-, monocarboxyl-, diamino- or dicarboxyl-terminated poly(NVP-co-vinyl alcohol); monoamino-, monocarboxyl-, diamino- or dicarboxyl-terminated poly(DMA-co-vinyl alcohol); poly[(meth)acrylic acid-co-acrylamide] with from about 0.1% to about 30%, preferably from about 0.5% to about 20%, more preferably from about 1% to about 15%, by weight of (meth)acrylic acid; poly[(meth)acrylic acid-co-NVP) with from about 0.1% to about 30%, preferably from about 0.5% to about 20%, more preferably from about 1% to about 15%, by weight of (meth)acrylic acid; a copolymer which is a polymerization product of a composition comprising (1) (meth)acryloyloxyethyl phosphorylcholine and (2) from about 0.1% to about 30%, preferably from about 0.5% to about 20%, more preferably from about 1% to about 15%, by weight of (meth)acrylic acid, allylamine and/or amino-$C_2$-$C_4$alkyl (meth)acrylate; and combination thereof.

PEGs with functional groups and multi-arm PEGs with functional groups can be obtained from various commercial suppliers, e.g., Polyscience, and Shearwater Polymers, inc., etc.

Monoamino-, monocarboxyl-, diamino- or dicarboxyl-terminated homo- or copolymers of one or more non-reactive hydrophilic vinylic monomers or of a phosphorylcholine-containing vinylic monomer can be prepared according to procedures described in U.S. Pat. No. 6,218,508, herein incorporated by reference in its entirety. For example, to prepare a diamino- or dicarboxyl-terminated homo- or co-polymer of a non-reactive hydrophilic vinylic monomer, the non-reactive vinylic monomer, a chain transfer agent with an amino or carboxyl group (e.g., 2-aminoethanethiol, 2-mercaptopropinic acid, thioglycolic acid, thiolactic acid, or other hydroxymercaptanes, aminomercaptans, or carboxyl-containing mercaptanes) and optionally other vinylic monomer are copolymerized (thermally or actinically) with a reactive vinylic monomer (having an amino or carboxyl group), in the presence of an free-radical initiator. Generally, the molar ratio of chain transfer agent to that of all of vinylic monomers other than the reactive vinylic monomer is from about 1:5 to about 1:100, whereas the molar ratio of chain transfer agent to the reactive vinylic monomer is 1:1. In such preparation, the chain transfer agent with amino or carboxyl group is used to control the molecular weight of the resultant hydrophilic polymer and forms a terminal end of the resultant hydrophilic polymer so as to provide the resultant hydrophilic polymer with one terminal amino or carboxyl group, while the reactive vinylic monomer provides the other terminal carboxyl or amino group to the resultant hydrophilic polymer. Similarly, to prepare a monoamino- or monocarboxyl-terminated homo- or co-polymer of a non-reactive hydrophilic vinylic monomer, the non-reactive vinylic monomer, a chain transfer agent with an amino or carboxyl group (e.g., 2-aminoethanethiol, 2-mercaptopropinic acid, thioglycolic acid, thiolactic acid, or other hydroxymercaptanes, aminomercaptans, or carboxyl-containing mercaptanes) and optionally other vinylic monomers are copolymerized (thermally or actinically) in the absence of any reactive vinylic monomer.

As used herein, a copolymer of a non-reactive hydrophilic vinylic monomer refers to a polymerization product of a non-reactive hydrophilic vinylic monomer with one or more additional vinylic monomers. Copolymers comprising a non-reactive hydrophilic vinylic monomer and a reactive vinylic monomer (e.g., a carboxyl-containing vinylic monomer) can be prepared according to any well-known radical polymerization methods or obtained from commercial suppliers. For example, copolymers containing methacryloyloxyethyl phosphorylcholine and carboxyl-containing vinylic monomer can be obtained from NOP Corporation (e.g., LIPIDURE®-A).

The weight average molecular weight $M_w$ of the hydrophilic polymer having at least one amino, carboxyl or thiol group (as a hydrophilicity-enhancing agent) is preferably from about 500 to about 1,000,000, more preferably from about 1,000 to about 500,000, even more preferably from about 5,000 to about 250,000 Daltons.

In accordance with the invention, the reaction between a hydrophilicity-enhancing agent and an epichlorohydrin-functionalized polyamine or polyamidoamine is carried out at a temperature of for a period of time sufficient (from about 0.3 hour to about 24 hours, preferably from about 1 hour to about 12 hours, even more preferably from about 2 hours to about 8 hours) to form a water-soluble and thermally-crosslinkable hydrophilic polymeric material containing azetidinium groups.

In accordance with the invention, the concentration of a hydrophilicity-enhancing agent relative to an epichlorohydrin-functionalized polyamine or polyamidoamine must be selected not to render a resultant hydrophilic polymeric material water-insoluble (i.e., a solubility of less than 0.005 g per 100 ml of water at room temperature) and not to consume more than about 99%, preferably about 98%, more preferably about 97%, even more preferably about 96% of the azetidinium groups of the epichlorohydrin-functionalized polyamine or polyamidoamine.

In accordance with the invention, the step of heating is performed preferably heating the silicone hydrogel contact lens immersed in a packaging solution comprising the hydrophilic polymeric material and at least one buffering agent in an amount sufficient to maintain a pH of from about 6.0 to about 8.5 and has a tonicity of from about 200 to about 450 milliosmol (mOsm) and a viscosity of from about 1 centipoise to about 20 centipoises at 25° C. in a lens package to and at a temperature from about 40° C. to about 140° C., preferably from about 60° C. to about 120° C., even more preferably from about 80° C. to about 95° C., for a period of time sufficient to covalently attach the hydrophilic polymeric material onto the surface of the silicone hydrogel contact lens through second covalent linkages each formed between one azetidinium group of the hydrophilic polymeric material and one of the reactive functional groups on and/or near the surface of the contact lens, thereby forming a crosslinked hydrophilic coating on the silicone hydrogel contact lens.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes) prior to dispensing to users. A person skilled in the art will understand well how to seal and sterilize lens packages.

In accordance with the invention, a packaging solution contains at least one buffering agent and one or more other ingredients known to a person skilled in the art. Examples of other ingredients include without limitation, tonicity agents, surfactants, antibacterial agents, preservatives, and lubricants (or water-soluble viscosity builders) (e.g., cellulose derivatives, polyvinyl alcohol, polyvinyl pyrrolidone).

The packaging solution contains a buffering agent in an amount sufficient to maintain a pH of the packaging solution in the desired range, for example, preferably in a physiologically acceptable range of about 6 to about 8.5. Any known, physiologically compatible buffering agents can be used. Suitable buffering agents as a constituent of the contact lens care composition according to the invention are known to the person skilled in the art. Examples are boric acid, borates, e.g. sodium borate, citric acid, citrates, e.g. potassium citrate, bicarbonates, e.g. sodium bicarbonate, TRIS (2-amino-2-hydroxymethyl-1,3-propanediol), Bis-Tris (Bis-(2-hydroxyethyl)-imino-tris-(hydroxymethyl)-methane), salts thereof, phosphate buffers, e.g. $Na_2HPO_4$, $NaH_2PO_4$, and $KH_2PO_4$ or mixtures thereof. A preferred bis-aminopolyol is 1,3-bis(tris[hydroxymethyl]-methylamino)propane (bis-TRIS-propane). The amount of each buffer agent in a packaging solution is preferably from 0.001% to 2%, preferably from 0.01% to 1%; most preferably from about 0.05% to about 0.30% by weight.

The packaging solution has a tonicity of from about 200 to about 450 milliosmol (mOsm), preferably from about 250 to about 350 mOsm. The tonicity of a packaging solution can be adjusted by adding organic or inorganic substances which affect the tonicity. Suitable occularly acceptable tonicity agents include, but are not limited to sodium chloride, potassium chloride, glycerol, propylene glycol, polyols, mannitols, sorbitol, xylitol and mixtures thereof.

A packaging solution of the invention has a viscosity of from about 1 centipoise to about 20 centipoises, preferably from about 1.5 centipoises to about 10 centipoises, more preferably from about 2 centipoises to about 5 centipoises, at 25° C.

According to the present invention, "in-packaging-coating solution" refers to a package solution comprising a water-soluble and thermally-crosslinkable hydrophilic polymeric material of the invention and/or a polyazetidinium groups-containing component. In a preferred embodiment, the in-packaging-coating solution comprises preferably from about 0.01% to about 2%, more preferably from about 0.05% to about 1.5%, even more preferably from about 0.1% to about 1%, most preferably from about 0.2% to about 0.5%, by weight of a water-soluble and thermally-crosslinkable hydrophilic polymeric material of the invention.

A silicone hydrogel contact lens obtained according to a method of the invention has a surface hydrophilicity/wettability characterized by having an averaged water contact angle of preferably about 90 degrees or less, more preferably about 80 degrees or less, even more preferably about 70 degrees or less, most preferably about 60 degrees or less.

In another preferred embodiment, a method of the invention can further comprise, before the step of heating, the steps of: contacting at room temperature the silicone hydrogel contact lens with an aqueous solution of the thermally-crosslinkable hydrophilic polymeric material to form a top layer (i.e., an LbL coating) of the thermally-crosslinkable hydrophilic polymeric material on the surface of the silicone hydrogel contact lens, immersing the silicone hydrogel contact lens with the top layer of the thermally-crosslinkable hydrophilic polymeric material in a packaging solution in a lens package; sealing the lens package; and autoclaving the lens package with the silicone hydrogel contact lens therein to form a crosslinked hydrophilic coating on the silicone hydrogel contact lens. Because of being positively charged, the thermally-crosslinkable hydrophilic polymeric material is believed to be capable of forming, on a silicone hydrogel contact lens, an LbL coating which is not covalently bound to the surface of a silicone hydrogel contact lens (i.e., through physical interactions), especially a contact lens having negatively-charged carboxyl groups on its surface.

By "azetidinium groups-containing component" is meant a composition of one or more monomer, oligomer or polymer molecules, or mixtures of one or more thereof, comprising on average at least two (2) azetidinium groups (substituted, unsubstituted or mixtures thereof) per molecule.

An azetidinium group is a four membered nitrogen-containing heterocycle, wherein the nitrogen is quarternized, and can be generally depicted by Formula (I):

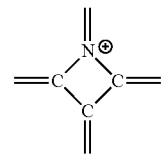

Note that the "double" bonds as depicted in Formula (I) are merely intended to reflect available substituent sites, as further exemplified below.

Due to the quarternized nitrogen, the azetidinium groups are cationic in nature and this should be taken into account in the formulation of these materials.

The carbons and nitrogens may be unsubstituted (hydrogen groups) or substituted depending on the particular molecule, albeit one of the nitrogen or opposite carbon (2-carbon) will be linked to or incorporated into a backbone or other bridging group to result in a molecule having at least two azetidinium groups. Molecules containing 2 or more azetidinium groups will be referred to as "polyazetidiniums".

In one embodiment, the polyazetidiniums comprise at least two units selected from the group consisting of Formula (II), Formula (III) and mixtures thereof:

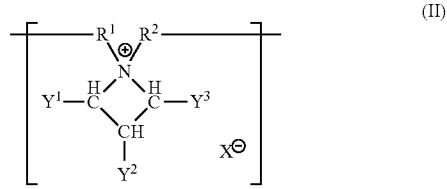

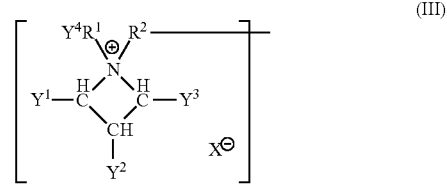

$R^1$ and $R^2$ are independently an alkylene group containing 1 to 6 carbon atoms ("lower alkylene");

X is an anionic counterion;

$Y^1$, $Y^2$ and $Y^3$ are each independently selected from the group consisting of hydrogen, hydroxyl, halo, alkoxy, alkyl, amino, carboxy, acetoxy, cyano and sulfhydryl (the groups with carbon atoms preferably having from 1 to 24 carbon atoms); and $Y^4$ is a chain-terminating group.

Examples of chain-terminating groups include, but are not limited to, hydrogen, alkyl, alkoxy and acyloxy (the groups with carbon atoms preferably having from 1 to 24 carbon atoms). Preferred are polymers wherein R1 and $R^2$ are methylene. Preferred counterions, X, include hydrogen sulfate, methane sulfonate, dihydrogen phosphate, nitrate, perchlorate and halide. $Y^1$, $Y^2$ and $Y^3$ are preferably independently hydrogen or lower alkyl (1 to 6 carbon atoms). $Y^2$ is preferably hydrogen or hydroxyl. Particularly preferred substituents are wherein $Y^1$ and $Y^3$ are hydrogen, and/or $Y^2$ is hydroxyl. With regard to the counterions, the ones mentioned are preferred because they have less tendency to react with the azetidinium moiety than the strongly nucleophilic co-reactive species.

In one preferred embodiment of a molecule containing groups (II) and/or (III), the polyazetidinium species can be a homopolymer or it can be a copolymer wherein one or more non-azetidinium monomer units are incorporated into backbone structure. The polymer may be essentially straight chain, or it may be branched or crosslinked. Polyazetidiniums can prepared by the reaction of epichlorohydrin with polyamino compounds, oligomers or polymers containing secondary amine groups. Polyamines include polyaminoamides and polyalkylene polyamines. Polyaminoamides can be prepared, for example, from diethylene triamine and a dicarboxylic acid such as adipic acid. Reaction of polyaminoamide polymers with epichlorohydrin can form azetidinium groups. The preparation of these sorts of polymers is described in U.S. Pat. No. 6,429,267 (the disclosure of which is incorporated by reference herein for all purposes as if fully set forth). A preferred resin is illustrated in Formula (IV)

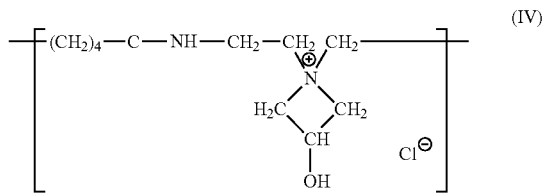

(IV)

An example of a commercial water-soluble poly(aminoamide)-epichlorohydrin resin is sold under the tradename Kymene™ 557 H (Hercules). Polyalkylene polyamines can be made by polymerizing diallylamine. Subsequent reaction with epichlorohydrin can form azetidinium groups, as illustrated in below:

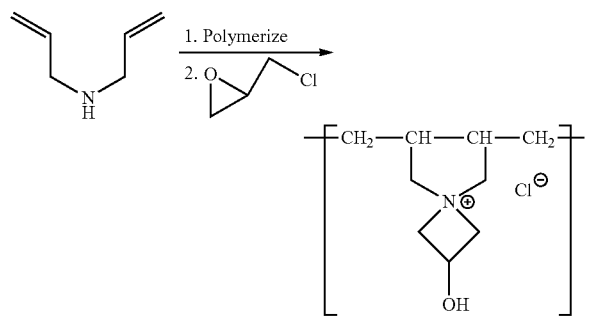

Kymene™ ULX wet-strength resin is a polyaminopolyamide-epi resin available from Hercules Incorporated. The one sample has a resin solids of 12.7% and a charge density of 3.36 meq/g at pH 1.8, 1.73 meq/g at pH 8 and 1.51 meq/g at pH 10. The another sample of Kymene™ ULX wet strength resin has a resin solids of 12.7% and a charge density of 3.28 meq/g at pH 1.8, 1.72 meq/g at pH 8 and 1.56 meq/g at pH 10.

E7045 wet-strength resin is a polyaminopolyamide-epi resin available from Hercules Incorporated. The sample has a charge density of 3.34 meq/g at pH 1.8, 1.96 meq/g at pH 8 and 0.89 meq/g at pH 10 and a total solids of 13.0%.

Kymene™ 557 LX wet-strength resin is a polyaminopolyamide-epi resin available from Hercules Incorporated. It has a pH of 3.5, a total solids of 12.5%, and a Brookfield viscosity of 47 cps. It had a charge density of 1.39 meq/g at pH 10.

Kymene™ 736 wet-strength resin is a polyalkylene polyamine-epi resin available from Hercules Incorporated. It has a pH of 3.3, a total solids of 37.8%, and a Brookfield viscosity of 250 cps. It has a charge density of 2.24 meq/g at pH 8.

Kymene™ ULX2 wet-strength resin is a polyaminopolyamide-epi resin available from Hercules Incorporated.

Preparation of these polymers is described in U.S. Pat. Nos. 3,700,623, 3,772,076, 4,298,639 and 4,298,715, the disclosures of which are incorporated by reference herein for all purposes as if fully set forth. Alternatively, the diallylamine can be reacted first with epichlorohydrin and cyclized to the azetidinium monomer, and then polymerized or copolymerized with other unsaturated co-monomers. This approach is described in U.S. Pat. Nos. 4,341,887 and 5,510,004, the disclosures of which are also incorporated by reference herein for all purposes as if fully set forth.

According to the present invention, a polyazetidinium groups-containing component is used to reduce the concentration of amino groups and/or carboxyl groups introduced on and/or near the silicone hydrogel contact lens surface during the crosslinked hydrophilic coating process in the first heating step of claim 1 by reaction between azetidinium groups of the polyazetidinium groups-containing component and residual amino groups and/or carboxyl groups remained on and/or the surface of the silicone hydrogel contact lens. The reduction of the concentration of amino groups and/or carboxyl groups introduced on and/or near the silicone hydrogel contact lens surface will reduce its positively charged preservatives or antimicrobial agents such as PHMB uptake during the lens cleaning/disinfecting/storing cycles. The accumulated antimicrobial agents in the lens may subsequence release once the lens is put in to the eye, causing the contact lens wearer's eye irritation. A suitable polyazetidinium groups-containing component can diffuse into the crosslinked hydrophilic coating layer of the silicone hydrogel contact lens and react with residual amino groups and/or carboxyl groups remained on and/or the surface of the silicone hydrogel contact lens to neutralize the residual charge. For example, the polyazetidinium groups-containing component will have molecular weight comparable to or lower than the positively charged preservatives or antimicrobial agents such as PHMB, or Polyquad.

Polyquad® (registered trademark of Alcon Laboratories, Inc.) which is also known as Onamer® (registered trademark of Millmaster Onyx Group) has been used successfully to provide disinfecting and preservation properties to contact lens treating solutions, eye drop solutions and preserved saline solutions. The chemical name for Polyquad® is alpha-4-[1-tris(2-hydroxyethyl)ammonium-2-butenyl]poly[1-dimethylammonium-2-butenyl]-.omega.-tris(2 hydroxyethyl)ammonium chloride. The salt has an average molecular weight generally in the range of from about 2,000 to about 30,000 and preferably in the range of about 3,000 to about 14,000. Ophthalmic compositions containing Polyquad® and methods for disinfecting contact lenses with solutions containing this polymer are disclosed in U.S. Pat. Nos. 5,037,647; 4,525,346 and 4,407,791.

PHMB, a poly(hexamethylene) biguanide, is described for use as antimicrobial agents in contact lens solution in U.S. Pat. No. 4,758,595. The patent discloses that molecular weight of PHMB can be up to approximately 100, 1000 and preferably from 1,000 to 50,000.

According to the present invention, a polyamidoamine epichlorohydrin with a wide range of molecular weight, as indicted by solution viscosity (at 23% solid) range of from 10 to 200 m·Pa·s, preferably from 30 to 160 m·Pa·s. and more preferably from 40 to 130 m·Pa·s.

The polyazetidinium groups-containing component is present in the packaging solution in an amount of from about 0.01% to about 5% by weight, preferably from about 0.05% to about 3% by weight, even more preferably from about 0.1% to about 1% by weight, based on the total amount of the packaging solution.

In accordance with the invention, the step of reducing the concentration of amino groups and/or carboxyl groups on and/or near the silicone hydrogel contact lens is performed preferably by autoclaving the silicone hydrogel contact lens immersed in a packaging solution (i.e., a buffered aqueous solution) in a sealed lens package at a temperature of from about 118° C. to about 125° C. for approximately 20-90 minutes. In accordance with this embodiment of the invention, the packaging solution is a buffered aqueous solution which is ophthalmically safe after autoclave.

It should be understood that although various embodiments including preferred embodiments of the invention may be separately described above, they can be combined and/or used together in any desirable fashion in the method of the invention for producing silicone hydrogel contact lenses each having a crosslinked hydrophilic coating thereon.

Various embodiments including preferred embodiments of silicone hydrogel contact lenses inherently having amino groups and/or carboxyl groups, silicone hydrogel contact lenses having a reactive base coating, reactive vinylic monomers, non-reactive vinylic monomers, reactive polymers for forming a reactive LbL base coating, plasma coatings, epichlorohydrin-functionalized polyamine or polyamidoamine, hydrophilicity enhancing agents, water-soluble hydrophilic polymeric materials with azetidinium groups, the step of heating, lens packages, packaging solutions, and surface wettability of a silicone hydrogel contact lens with a crosslinked hydrophilic coating of the invention are described above and can be combined and/or used together in these two aspects of the invention.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together. Therefore, the spirit and scope of the appended claims should not be limited to the description of the preferred versions contained therein.

PHMB (Polyhexamethylene Biguanide) Uptake Measurement.

Each lens is soaked overnight in 3 ml of 10 ppm of PHMB. The uptake of PHMB into the lens is measured by the depletion of PHMB from the absorption of a UV peak at 240 nm.

Lubricity Evaluation

The lubricity rating is a qualitative ranking scheme where a scale of 0 to 4 is used with 0 or lower numbers indicating better lubricity, 1 is assigned to Oasys™/TruEye™ commercial lenses and 4 is assigned to commercial Air Optix™ lenses. The samples are rinsed with excess DI water for at least three times and then transferred to PBS before the evaluation. Before the evaluation, hands are rinsed with a soap solution, extensively rinsed with DI water and then dried with KimWipe® towels. The samples are handled between the fingers and a numerical number is assigned for each sample relative to the above standard lenses described above. For example, if lenses are determined to be only slightly better than Air Optix™ lenses, then they are assigned a number 3. For consistency, all ratings are independently collected by the same two operators in order to avoid bias and the data so far reveal very good qualitative agreement and consistency in the evaluation.

Surface hydrophilicity/wetability Tests. Water contact angle on a contact lens is a general measure of the surface hydrophilicity (or wetability) of the contact lens. In particular, a low water contact angle corresponds to more hydrophilic surface. Average contact angles (Sessile Drop) of contact lenses are measured using a VCA 2500 XE contact angle measurement device from AST, Inc., located in Boston, Mass. This equipment is capable of measuring advancing or receding contact angles or sessile (static) contact angles. The measurements are performed on fully hydrated contact lenses and immediately after blot-drying as follows. A contact lens is removed from the vial and washed 3 times in ~200 ml of fresh DI water in order to remove loosely bound packaging additives from the lens surface. The lens is then placed on top of a lint-free clean cloth (Alpha Wipe TX1009), dabbed well to remove surface water, mounted on the contact angle measurement pedestal, blown dry with a blast of dry air and finally the sessile drop contact angle is automatically measured using the software provided by the manufacturer. The DI water used for measuring the contact angle has a resistivity >18MΩcm and the droplet volume used is 2 µl. Typically, uncoated silicone hydrogel lenses (after autoclave) have a sessile drop contact angle around 120 degrees. The tweezers and the pedestal are washed well with Isopropanol and rinsed with DI water before coming in contact with the contact lenses.

Water Break-up Time (WBUT) Tests. The wettability of the lenses (after autoclave) is also assessed by determining the time required for the water film to start breaking on the lens surface. Briefly, lenses are removed from the vial and washed 3 times in ~200 ml of fresh DI water in order to remove loosely bound packaging additives from the lens surface. The lens is removed from the solution and held against a bright light source. The time that is needed for the water film to break (de-wet) exposing the underlying lens material is noted visually. Uncoated lenses typically instantly break upon removal from DI water and are assigned a WBUT of 0 seconds. Lenses exhibiting WBUT 5 seconds are considered wettable and are expected to exhibit adequate wettability (ability to support the tear film) on-eye.

Example 1

Preparation of Chain-Extended Polydimethylsiloxane Vinylic Macromer with Terminal Methacrylate Groups (CE-PDMS Macromer)

In the first step, α,ω-bis(2-hydroxyethoxypropyl)-polydimethylsiloxane (Mn=2000, Shin-Etsu, KF-6001a) is capped with isophorone diisocyanate (IPDI) by reacting 49.85 g of α,ω-bis(2-hydroxyethoxypropyl)-polydimethylsiloxane with 11.1 g IPDI in 150 g of dry methyl ethyl ketone (MEK) in the presence of 0.063 g of dibutyltindilaurate (DBTDL). The reaction is kept for 4.5 h at 40° C., forming IPDI-PDMS-IPDI. In the second step, a mixture of 164.8 g of α,ω-bis(2-hydroxyethoxypropyl)-polydimethylsiloxane (Mn=3000, Shin-Etsu, KF-6002) and 50 g of dry MEK are added dropwise to the IPDI-PDMS-IPDI solution to which has been added an additional 0.063 g of DBTDL. The reactor is held for 4.5 h at about 40° C., forming HO-PDMS-IPDI-PDMS-IPDI-PDMS-OH. MEK is then removed under reduced pressure. In the third step, the terminal hydroxyl-groups are capped with methacryloyloxyethyl groups in a third step by addition of 7.77 g of isocyanatoethylmethacrylate (IEM) and an additional 0.063 g of DBTDL, forming IEM-PDMS-IPDI-PDMS-IPDI-PDMS-IEM.

Alternate Preparation of CE-PDMS Macromer with Terminal Methacrylate Groups 240.43 g of KF-6001 is added into a 1-L reactor equipped with stirring, thermometer, cryostat, dropping funnel, and nitrogen/vacuum inlet adapter, and then dried by application of high vacuum ($2 \times 10^{-2}$ mBar). Then, under an atmosphere of dry nitrogen, 320 g of distilled MEK is then added into the reactor and the mixture is stirred thoroughly. 0.235 g of DBTDL is added to the reactor. After the reactor is warmed to 45° C., 45.86 g of IPDI are added through an addition funnel over 10 minutes to the reactor under moderate stirring. The reaction is kept for 2 hours at 60° C. 630 g of KF-6002 dissolved in 452 g of distilled MEK are then added and stirred until a homogeneous solution is formed. 0.235 g of DBTDL are added, and the reactor is held at about 55° C. overnight under a blanket of dry nitrogen. The next day, MEK is removed by flash distillation. The reactor is cooled and 22.7 g of IEM are then charged to the reactor followed by about 0.235 g of DBTDL. After about 3 hours, an additional 3.3 g of IEM are added and the reaction is allowed to proceed overnight. The following day, the reaction mixture is cooled to about 18° C. to obtain CE-PDMS macromer with terminal methacrylate groups.

Preparation of Lens Formulations

A lens formulation is prepared by dissolving components in 1-propanol to have the following composition: 33% by weight of CE-PDMS macromer prepared in Example 2, 17% by weight of N-[tris(trimethylsiloxy)-silylpropyl]acrylamide (TRIS-Am), 24% by weight of N,N-dimethylacrylamide (DMA), 0.5% by weight of N-(carbonyl-methoxypolyethylene glycol-2000)-1,2-disteaoyl-sn-glycero-3-phosphoethanolamin, sodium salt) (L-PEG), 1.0% by weight Darocur 1173 (DC1173), 0.1% by weight of visitint (5% copper phthalocyanine blue pigment dispersion in tris(trimethylsiloxy)silylpropylmethacrylate, TRIS), and 24.5% by weight of 1-propanol.

Preparation of Lenses

Lenses are prepared by cast-molding from the lens formulation prepared above in a reusable mold, similar to the mold shown in FIGS. 1-6 in U.S. Pat. Nos. 7,384,590 and 7,387,759 (FIGS. 1-6). The mold comprises a female mold half made of quartz (or $CaF_2$) and a male mold half made of glass (or PMMA). The UV irradiation source is a Hamamatsu lamp with the WG335+TM297 cut off filter at an intensity of about 4 mW/cm$^2$. The lens formulation in the mold is irradiated with UV irradiation for about 25 seconds. Cast-molded lenses are extracted with isopropanol (or methyl ethyl ketone, MEK), rinsed in water, coated with polyacrylic acid (PAA) by dipping lenses in a propanol solution of PAA (0.1% by weight, acidified with formic acid to about pH 2.5), and hydrated in water. Resultant lenses having a reactive PAA-LbL base coating thereon are determined to have the following properties: ion permeability of about 8.0 to about 9.0 relative to Alsacon lens material; apparent Dk (single point) of about 90 to 100; a water content of about 30% to about 33%; and an elastic modulus of about 0.60 MPa to about 0.65 MPa.

Example 2

Charge Neutralization of IPC #1 with PAE with Relatively High Viscosity

Lenses with PAA-x-PAE-x-PAAm/PAA in packaging coating (referred to as IPC #1 in this application) were prepared using the procedures shown in US2012/0026457 A1.

Poly(acrylamide-co-acrylic acid) partial sodium salt (~90% solid content, poly(AAm-co-AA) 90/10, Mw 200,000) is purchased from Polysciences, Inc. and used as received.

An IPC saline is prepared by dissolving 0.07% of PAAm-PAA (90/10) and 0.2% of PAE (Kymene) in PBS and adjusting the pH to 7.2~7.4. Then the saline is heat pre-treated for about 4 hours at about 70° C. or 6 hr at about 60° C., forming a water-soluble and thermally-crosslinkable hydrophilic polymeric material containing azetidinium groups. After the heat pre-treatment, the IPC saline is filtered using a 0.22 micron polyether sulphone [PES] membrane filter and cooled down back to room temperature.

Lenses having a PAA-base coating are placed in a polypropylene lens packaging shells with 0.6 mL of the heat-pretreated IPC saline (half of the IPC saline is added prior to inserting the lens). The blister is then sealed with foil and autoclaved for about 30 minutes at 121° C., forming a crosslinked coating (PAA-x-PAEXPAAm-PAA) on the lenses.

A charge-neutralization saline #1 (CNS #1) is prepared by dissolving appropriate concentration of PAE in PBS (phosphate buffered saline). For example, 1% of PAE (from Kymene VSP33PL liquid, with a viscosity of 126 m·Pa·s at 25% solid) in PBS was prepared by simply adding 1 g of PAE to 100 ml of PBS. The packaging shells of above-mentioned lenses with IPC #1 coating were opened. Then the lenses are repackaged in either PBS or CNS#1 and autoclaved for 45 min.

The lenses are tested for PHMB uptake. Each lens is soaked overnight in 3 ml of 10 ppm of PHMB. The uptake of PHMB into the lens is measured by the depletion of PHMB from the absorption of a UV peak at 240 nm.

The PHMB uptake for the test lenses (autoclaved in CNS#1) is 14.2±1.9 micrograms per lens, which is lower than 17.8±1.2 micrograms per lens for control lenses (autoclaved in PBS). This represent 20.2% reduction in PHMB uptake for the test lenses treated with 1% relatively high viscosity PAE in a phosphate buffered saline compare to the control lens.

Example 3

Charge Neutralization of IPC #1 with PAE with Relatively Low Viscosity (as Compared to PAE from Example 2

Lenses with PAA-x-PAE-x-PAAm/PAA in packaging coating (referred to as IPC #1 in this application) were prepared using the procedures shown in US2012/0026457 A1 and as described above in example #2. A charge-neutralization saline #2 (CNS #2) is prepared by dissolving appropriate concentration of PAE in PBS (phosphate buffered saline). For example, 0.5% of PAE (from Amres MOC-3029 liquid, with a viscosity of 44 m·Pa·s at 20% solid) in PBS was prepared by simply adding 0.5 g of PAE to 100 ml of PBS. The packaging shells of above-mentioned lenses with IPC #1 coating were opened. Then the lenses are repackaged in either PBS or CNS#1 and autoclaved for 45 min.

The lenses are tested for PHMB uptake. Each lens is soaked overnight in 3 ml of 10 ppm of PHMB. The uptake of PHMB into the lens is measured by the depletion of PHMB from the absorption of a UV peak at 240 nm.

The PHMB uptake for the test lenses (autoclaved in CNS#2) is 12.2±0.8 micrograms per lens, which is lower than 20.4±1.2 micrograms per lens for control lenses (autoclaved in PBS). This represent 40.2% reduction in PHMB uptake for the test lenses treated with 0.5% relatively low viscosity PAE in a phosphate buffered saline compare to the control lens.

The finger lubricity is rated as 4 for the test lenses, in a 0 to 4 scale (0 is most lubricious and 4 is the least lubricious). The finger lubricity is rated as 0 for the control lenses. The water contact angle is 36 for the test lenses and 38 for the control lenses. The WBUT (water beak up time) is about 6 seconds for the test lenses and about 15 seconds for the control lenses.

Example 4

Charge Neutralization of IPC #1 with PAE with Relatively Low Viscosity (as Compared to PAE from Example 2

Lenses with PMAA-x-PAE-x-PAAm-PAA in packaging coating (referred to as IPC #1 in this application) were prepared using the procedures shown in US2012/0026457 A1 and as described above in example #2. A charge-neutralization saline #3 (CNS #3) is prepared by dissolving appropriate concentration of PAE in PBS (phosphate buffered saline). For example, 1% of PAE (from Amres MOC-3029 liquid, with a viscosity of 44 m·Pa·s at 20% solid) in PBS was prepared by simply adding 1 g of PAE to 100 ml of PBS. The packaging shells of above-mentioned lenses with IPC #1 coating were opened. Then the lenses are repackaged in either PBS or CNS#1 and autoclaved for 45 min.

The lenses are tested for PHMB uptake. Each lens is soaked overnight in 3 ml of 10 ppm of PHMB. The uptake of PHMB into the lens is measured by the depletion of PHMB from the absorption of a UV peak at 240 nm.

The PHMB uptake for the test lenses (autoclaved in CNS#3) is 14.3±0.5 micrograms per lens, which is lower than 20.4±1.2 micrograms per lens for control lenses (autoclaved in PBS). This represent 30% reduction in PHMB uptake for the test lenses treated with 1% relatively low viscosity PAE in a phosphate buffered saline compare to the control lens.

The finger lubricity is rated as 4 for the test lenses, in a 0 to 4 scale (0 is most lubricious and 4 is the least lubricious). The finger lubricity is rated as 0 for the control lenses. The water contact angle is 39 for the test lenses and 38 for the control lenses. The WBUT (water beak up time) is about 6 seconds for the test lenses and about 15 seconds for the control lenses.

Example #5

Charge Neutralization of IPC #2 with PAE with Relatively Low Viscosity (as Compared to PAE from Example 2)

Lenses with PMAA-x-PAE-x-PEG in packaging coating (referred to as IPC #2 in this application) were prepared using the procedures shown in US2012/0026457 A1. A reaction mixture is prepared by dissolving 2.86% by weight of methoxy-poly (ethyleneglycol)-thiol, avg Mw 2000 (Product #MPEG-SH-2000, Laysan Bio Inc.) along with 2% by weight of PAE (Kymene) in PBS and the final pH adjusted to 7.5. The solution is heat-treated under nitrogen for about 4 hours at 45° C. forming a thermally crosslinkable hydrophilic polymeric material containing MPEG-SH-2000 groups chemically grafted onto the polymer by reaction with the Azetidinium groups in PAE. After the heat-treatment, the solution is diluted 10-fold with PBS containing 0.25% sodium citrate, pH adjusted to 7.2~7.4, and then filtered using 0.22 micron polyether sulphone (PES) membrane filter. The final IPC saline contains 0.286% by weight of hydrophilic polymeric material (consisting of about 59% by weight of MPEG-SH-2000 chains and about 41% by weight of PAE chains) and 0.25% Sodium citrate. PBS is prepared by dissolving 0.74% NaCl, 0.053% $NaH_2PO_4.H_2O$ and 0.353% $Na_2HPO_4.2H_2O$ in water.

There are two differences between IPC #1 and IPC #2: (1) PAA (poly(acrylic acid)) in IPC #1 is replaced with PMAA (poly(methylacrylic acid)); (2) PAAm-PAA in IPC #1 is replaced by PEG (polyethylene glycol).

A charge-neutralization saline #3 (CNS #3) is prepared by dissolving appropriate concentration of PAE in PBS (phosphate buffered saline). For example, 1% of PAE (from Amres MOC-3029 liquid, with a viscosity of 44 m·Pa·s at 20% solid) in PBS was prepared by simply adding 1 g of PAE to 100 ml of PBS. The packaging shells of above-mentioned lenses with IPC #1 coating were opened. Then the lenses are repackaged in either PBS or CNS#1 and autoclaved for 45 min.

The lenses are tested for PHMB uptake. Each lens is soaked overnight in 3 ml of 10 ppm of PHMB. The uptake of PHMB into the lens is measured by the depletion of PHMB from the absorption of a UV peak at 240 nm.

The PHMB uptake for the test lenses (autoclaved in CNS#3) is 0.4±0.2 micrograms per lens, which is lower than 1.4±0.3 micrograms per lens for control lenses (autoclaved in PBS). This represent 71.4% reduction in PHMB uptake for the test lenses treated with 1% relatively low viscosity PAE in a phosphate buffered saline compare to the control lens.

The finger lubricity is rated as 1 for the test lenses, in a 0 to 4 scale (0 is most lubricious and 4 is the least lubricious). The finger lubricity is rated as 0.5 for the control lenses. The water contact angle is 41 for the test lenses and 41 for the control lenses. The WBUT (water beak up time) is about 6 seconds for the test lenses and about 5 seconds for the control lenses

What is claimed is:

1. A method for producing silicone hydrogel contact lenses with crosslinked hydrophilic coatings thereon, comprising the steps of:

(a) obtaining a silicone hydrogel contact lens having amino groups and/or carboxyl groups on and/or near its surface and a water-soluble and thermally-crosslinkable hydrophilic polymeric material, wherein the silicone hydrogel contact lens comprises amino groups or carboxyl groups or both on and/or near the surface of the contact lens, wherein the hydrophilic polymeric material comprises (i) from about 20% to about 95 by weight of first polymer chains derived from an epichlorohydrin-functionalized polyamine or polyamidoamine, (ii) from about 5% to about 80% by weight of hydrophilic moieties or second polymer chains derived from at least one hydrophilicity-enhancing agent having at least one reactive functional group selected from the group consisting of amino group, carboxyl group, thiol group, and combination thereof, and (iii) positively-charged azetidinium groups which are parts of the first polymer chains or pendant or terminal groups covalently attached to the first polymer chains, wherein the hydrophilic moieties or second polymer chains are covalently attached to the first polymer chains through one or more covalent linkages each formed between one azetitdinium group of the epichlorohydrin-functionalized polyamine or polyamidoamine and one amino, carboxyl or thiol group of the hydrophilicity-enhancing agent; and (b) heating the silicone hydrogel contact lens immersed in a packaging solution comprising the hydrophilic polymeric material and at least one buffering agent in an amount sufficient to maintain a pH of from about 6.0 to about 8.5 and has a tonicity of from about 200 to about 450 milliosmol (mOsm) and a viscosity of from about 1 centipoise to about 20 centipoises at 25° C. in a lens package to and at a temperature from about 40° C. to about 140° C. for a period of time sufficient to covalently attach the hydrophilic polymeric material onto the surface of the silicone hydrogel contact lens through second covalent linkages each formed between one azetidinium group of the hydrophilic polymeric material and one of the reactive functional groups on and/or near the surface of the contact lens, thereby forming a crosslinked hydrophilic coating on the silicone hydrogel contact lens, (c) adding a polyazetidinium groups-containing component into the package solution with the silicone contact lens of the step (b), wherein the polyazetidinium groups-containing component comprise at least two groups selected from the group consisting of Formula (II), Formula (III) and mixtures thereof:

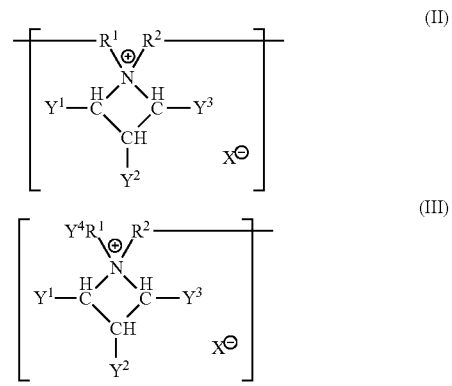

wherein: $R^1$ and $R^2$ are independently an alkylene group containing 1 to 6 carbon atoms; X is an anionic counterion; $Y^1$, $Y^2$ and $Y^3$ are each independently selected from the group consisting of hydrogen, hydroxyl, halo, alkoxy, alkyl, amino, carboxy, acetoxy, cyano and sulfhydryl; and $Y^4$ is a chain-terminating group, selected from the group consisting of hydrogen, alkyl, alkoxy and acyloxy;

(d) sealing the lens package with the contact lens and the package solution of step (c)

(e) reducing the concentration of amino groups and/or carboxyl groups on and/or near the silicone hydrogel contact lens by autoclaving the package with the contact lens and the in-package-coating solution therein of step (d) and inducing reaction between azetidinium groups of the polyazetidinium groups-containing component and residual amino groups and/or carboxyl groups remained on and/or the surface of the silicone hydrogel contact lens immersed in the in-package-coating solution, wherein the reduction of the concentration of carboxyl groups on and/or near the silicone hydrogel contact lens of step (e) is characterized by having an decreased positively charged preservatives uptake in relation to the silicone hydrogel contact lens of step (b) by at least 20%.

2. The method of claim 1, wherein the polyazetidinium groups-containing component has a solution viscosity range from 10 to 200 m·Pa·s. at 23% solid.

3. The method of claim 2, wherein the polyazetidinium groups-containing component has a solution a viscosity range from 30 to 160 m·Pa·s. at 23% solid.

4. The method of claim 3, wherein the polyazetidinium groups-containing component has a solution a viscosity range from 40 to 130 m·Pa·s. at 23% solid.

5. The method of claim 1, wherein the in-packaging-coating solution of step (b) comprises from 0.01% to 2% by weight of thermally-crosslinkable hydrophilic polymeric material.

6. The method of claim 1, wherein the polyazetidinium groups-containing component is added in the in-packaging-coating solution of step (c) in an amount of from about 0.01% to about 5% by weight based on the total amount of the in-packaging-coating solution.

7. The method of claim 1, wherein the step of heating is perform by heating the silicone hydrogel contact lens immersed in a packaging solution in a sealed lens package at a temperature from about 40° C. to about 140° C. for approximately 20-180 minutes and the step of reducing the concentration of amino groups and/or carboxyl groups on and/or near the silicone hydrogel contact lens by autoclaving the package with the contact lens and the in-package-coating solution at a temperature of from about 118° C. to about 125° C. for approximately 20-90 minutes.

8. The method of claim 7, wherein the step of heating is perform by heating the silicone hydrogel contact lens immersed in a packaging solution in a sealed lens package at a temperature from about 75° C. to about 95° C. for approximately 20-180 minutes and the step of reducing the concentration of amino groups and/or carboxyl groups on and/or near the silicone hydrogel contact lens by autoclaving the package with the contact lens and the in-package-coating solution at a temperature of from about 118° C. to about 125° C. for approximately about 118° C. to about 125° C. for approximately 20-40 minutes.

9. The method of claim 1, wherein the hydrophilicity-enhancing agent is a hydrophilic polymers having one or more amino, carboxyl and/or thiol groups, wherein the content of monomeric units having an amino, carboxyl or thiol group in the hydrophilic polymer as the hydrophilicity-enhancing agent is less than about 40% by weight based on the total weight of the hydrophilic polymer.

10. The method of claim 1, wherein the weight average molecular weight Mw of the hydrophilic polymer having at least one amino, carboxyl or thiol group from about 500 to about 1,000,000 Daltons.

11. The method of claim 1, wherein the silicone hydrogel contact lens comprises a reactive base coating including amino and/or carboxyl groups.

12. The method of claim 11, wherein the reactive base coating comprises at least one layer of a reactive polymer having pendant amino groups and/or carboxyl groups and is obtained by contacting the silicone hydrogel contact lens with a solution of the reactive polymer, wherein the reactive polymer is: a homopolymer of amino-$C_1$ to $C_4$ alkyl (meth)acrylamide, amino-$C_1$ to $C_4$ alkyl (meth)acrylate, $C_1$ to $C_4$ alkylamino-$C_1$ to $C_4$ alkyl (meth)acrylamide, $C_1$ to $C_4$ alkylamino-$C_1$ to $C_4$ alkyl (meth)acrylate, allylamine, or vinylamine; polyethyleneimine; a polyvinylalcohol with pendant amino groups; a linear or branched polyacrylic acid; a homopolymer of $C_1$ to $C_{12}$ alkylacrylic acid; a copolymer of amino-$C_2$ to $C_4$ alkyl (meth)acrylamide, amino-$C_2$ to $C_4$ alkyl (meth)acrylate, $C_1$ to $C_4$ alkylamino-$C_2$ to $C_4$ alkyl (meth)acrylamide, $C_1$ to $C_4$ alkylamino-$C_2$ to $C_4$ alkyl (meth)acrylate, acrylic acid, $C_1$ to $C_{12}$ alkylacrylic acid, maleic acid, and/or fumaric acid, with at least one non-reactive hydrophilic vinylic monomer; a carboxyl-containing cellulose; hyaluronate; chondroitin sulfate; poly(glutamic acid); poly(aspartic acid); or combinations thereof.

13. The method of claim 12, wherein the reactive polymer for forming a base coating is polyacrylic acid, polymethacrylic acid, poly(N,N-2-acrylamidoglycolic acid), poly[(meth)acrylic acid-co-acrylamide], poly[(meth)acrylic acid-co-vinylpyrrolidone], hydrolyzed poly[(meth)acrylic acid-co-vinylacetate], polyethyleneimine (PEI), polyallylamine hydrochloride (PAH) homo- or copolymer, polyvinylamine homo- or copolymer, or combinations thereof.

14. The method of claim 13, wherein the weight average molecular weight Mw of a reactive polymer for forming a reactive base coating is at least about 10,000 Daltons.

15. The method of claim 14, wherein the weight average molecular weight Mw of a reactive polymer for forming a reactive base coating is from about 10,000 to 1,000,000 Daltons.

16. The method of claim 13, wherein the reactive polymer is dissolved in a mixture of water and one or more organic solvents, an organic solvent, or a mixture of one or more organic solvents.

* * * * *